(12) United States Patent
Cundall

(10) Patent No.: US 11,635,871 B1
(45) Date of Patent: Apr. 25, 2023

(54) COMMAND BASED PERSONALIZED COMPOSITE ICONS

(71) Applicant: Microsoft Technology Licensing, LLC, Redmond, WA (US)

(72) Inventor: Samuel Robert Cundall, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/524,314

(22) Filed: Nov. 11, 2021

(51) Int. Cl.
*G06F 3/04817* (2022.01)
*G06F 40/205* (2020.01)
*G06F 40/274* (2020.01)
*G06F 9/451* (2018.01)

(52) U.S. Cl.
CPC .......... *G06F 3/04817* (2013.01); *G06F 9/451* (2018.02); *G06F 40/205* (2020.01); *G06F 40/274* (2020.01)

(58) Field of Classification Search
CPC .................................................. G06F 3/04817
See application file for complete search history.

(56) References Cited

U.S. PATENT DOCUMENTS

| | | | |
|---|---|---|---|
| 8,620,850 B2 | 12/2013 | Brown et al. | |
| 9,152,219 B2 | 10/2015 | Dai et al. | |
| 9,684,430 B1 | 6/2017 | Perigault | |
| 10,353,542 B2 * | 7/2019 | Sinha | G06F 3/0482 |
| 10,379,719 B2 | 8/2019 | Scapel et al. | |
| 10,410,180 B2 | 9/2019 | Druck | |
| 10,515,464 B2 | 12/2019 | Stukalov | |
| 10,659,415 B1 | 5/2020 | Ledet | |
| 10,706,271 B2 | 7/2020 | Bryant et al. | |
| 10,979,375 B2 | 4/2021 | Young et al. | |
| 11,069,103 B1 | 7/2021 | Blackstock et al. | |
| 11,128,591 B1 | 9/2021 | Deering et al. | |
| 2004/0215731 A1 | 10/2004 | Tzann-en | |
| 2007/0054679 A1 | 3/2007 | Cho | |
| 2011/0183691 A1 | 7/2011 | Kwon et al. | |
| 2012/0192096 A1 * | 7/2012 | Bowman | G06F 3/04895 715/780 |
| 2013/0103766 A1 | 4/2013 | Gupta | |
| 2015/0121251 A1 | 4/2015 | Kadirvel | |
| 2016/0244011 A1 | 8/2016 | Ricci | |
| 2016/0321328 A1 | 11/2016 | Duckworth et al. | |

(Continued)

FOREIGN PATENT DOCUMENTS

IN 202041025971 A 12/2021
KR 20030026506 A 4/2003

(Continued)

OTHER PUBLICATIONS

"Non Final Office Action Issued in U.S. Appl. No. 17/524,299", dated May 12, 2022, 9 Pages.

(Continued)

*Primary Examiner* — Roland J Casillas
(74) *Attorney, Agent, or Firm* — Schwegman Lundberg & Woessner, P.A.

(57) ABSTRACT

A method and system for causing a command-based personalized composite icon to be displayed in a communication stream are disclosed, the personalized composite icon including comprising a representation of a first user combined with a selected icon.

20 Claims, 24 Drawing Sheets

(56) References Cited

U.S. PATENT DOCUMENTS

| | | | |
|---|---|---|---|
| 2017/0083174 A1 | 3/2017 | Tobens et al. | |
| 2017/0153802 A1* | 6/2017 | Ali | H04M 1/72403 |
| 2017/0177554 A1 | 6/2017 | Emmons et al. | |
| 2017/0336958 A1* | 11/2017 | Chaudhri | G06F 3/0481 |
| 2017/0336960 A1 | 11/2017 | Chaudhri et al. | |
| 2018/0024726 A1 | 1/2018 | Hviding | |
| 2018/0129326 A1 | 5/2018 | Okazawa et al. | |
| 2018/0329592 A1 | 11/2018 | Ramarao et al. | |
| 2018/0356957 A1 | 12/2018 | Desjardins | |
| 2019/0122403 A1 | 4/2019 | Woo et al. | |
| 2020/0005513 A1 | 1/2020 | Li et al. | |
| 2020/0034033 A1 | 1/2020 | Chaudhri et al. | |
| 2021/0096729 A1 | 4/2021 | Dalonzo et al. | |
| 2021/0141866 A1 | 5/2021 | Chen et al. | |

FOREIGN PATENT DOCUMENTS

| | | |
|---|---|---|
| KR | 102134455 B1 | 7/2020 |
| WO | 2015183755 A1 | 12/2015 |
| WO | 2018017728 A1 | 1/2018 |
| WO | 2019029406 A1 | 2/2019 |

OTHER PUBLICATIONS

"Non-Final Office Action Issued in U.S. Appl. No. 17/341,795", dated Mar. 17, 2022, 14 Pages.

U.S. Appl. No. 17/341,962, filed Jun. 8, 2021.

U.S. Appl. No. 17/341,795, filed Jun. 8, 2021.

U.S. Appl. No. 17/524,299, filed Nov. 11, 2021.

"Application as Filed in U.S. Appl. No. 17/341,962", filed Jun. 8, 2021, 50 Pages.

"Facial Recognition for Personalized Emojis", Retrieved from: https://distillery.com/blog/facial-recognition-personalized-emojis/, Nov. 30, 2016, 22 Pages.

"How to Make Emojis . . . Of Yourself!", Retrieved from: http://emojimyface.com/, Jun. 4, 2015, 8 Pages.

"T1 Tatsu", Retrieved from: https://web.archive.org/web/20201026123858/https://tatsu.fandom.com/wiki/Information, Oct. 26, 2020, 4 Pages.

Carey, Conner, "Howto React to a Message with a Sticker on iPhone", Retrieved from: https://www.iphonelife.com/content/how-to-react-to-message-sticker-iphone, Jan. 12, 2017, 8 Pages.

Dar, Pranav, "You can now Build your own 3D Digital Face Emoji using Deep Learning", Retrieved from: https://www.analyticsvidhya.com/blog/2018/03/build-your-own-facial-emoji-using-deep-learning/, Mar. 16, 2018, 5 Pages.

Gonzalez, Neil, "Turn Any Photo You Want into a Custom Emoji Icon on Your iPhone", Retrieved from: https://ios.gadgethacks.com/how-to/turn-any-photo-you-want-into-custom-emoji-icon-your-iphone-0156573/, Jul. 29, 2014, 8 Pages.

Nemire, Brad, "New App Turns Your Selfie Into a Personalized Emoji", Retrieved from: https://news.developer.nvidia.com/new-app-turns-your-selfie-into-a-personalized-emoji/, Dec. 14, 2017, 2 Pages.

Perez, Sarah, "Google's Gboard Now Lets you Create a Set of Emoji that Look Like You", Retrieved from: https://techcrunch.com/2018/10/30/googles-gboard-now-lets-you-create-a-set-of-emoji-that-look-like-you/, Oct. 31, 2018, 5 Pages.

Sattelberg, William, "How To Get More Filters On Snapchat", Retrieved from: https://www.alphr.com/get-more-filters-snapchat/, Apr. 18, 2021, 44 Pages.

"Non Final Office Action Issued in U.S. Appl. No. 17/341,962", dated Aug. 18, 2022, 19 Pages.

"International Search Report and Written Opinion Issued in PCT Application No. PCT/US22/027977", dated Aug. 25, 2022, 11 Pages.

"International Search Report and Written Opinion Issued in PCT Application No. PCT/US22/028403", dated Aug. 19, 2022, 9 Pages.

"Notice of Allowance Issued in U.S. Appl. No. 17/524,299", dated Sep. 21, 2022, 11 Pages.

"Final Office Action Issued in U.S. Appl. No. 17/341,795", dated Jul. 6, 2022, 20 Pages.

"A Guide To Microsoft Teams For Beginners: 101", Retrieved From: https://web.archive.org/web/20210328034436if_/https://www.officesolutionsit.com.au/hubfs/Content/Microsoft%20Teams/Office%20Solutions%20IT%20-%20Microsoft%20Teams%20101%20guide.pdf, Mar. 28, 2021, 22 Pages.

"Sublime Text Community Documentation", Retrieved From: https://web.archive.org/web/20210509010829/https://docs.sublimetext.io/guide/extensibility/completions.html, May 9, 2021, 5 Pages.

"Notice of Allowance Issued in U.S. Appl. No. 17/341,795", dated Nov. 1, 2022, 8 Pages.

"International Search Report and Written Opinion issued in PCT Application No. PCT/US22/040385", dated Nov. 24, 2022, 17 Pages.

"International Search Report and Written Opinion issued in PCT Application No. PCT/US22/040386", dated Nov. 24, 2022, 14 Pages.

\* cited by examiner

US 11,635,871 B1

COMMAND BASED PERSONALIZED COMPOSITE ICONS

TECHNICAL FIELD

The present disclosure generally refers to methods and systems for command-based generation of personalized composite icons in a communication stream in accordance with some embodiments.

BACKGROUND

The use of software and hardware technologies have become a commonplace method of communication between people. Text communication, in particular, such as through instant messaging, text messaging, chat applications, email communications, etc., has become a primary way of communication. However, text communication lacks the ability to convey emotions and nuanced human behaviors that are perceivable in face-to-face, and even video and voice interactions.

SUMMARY

Electronic communication occurs nearly instantaneously. Although technology improvements allow people to send and receive text, images, audio, and other electronic media with speed and reliability, virtual interactions can still feel stale and impersonal. Systems and methods contemplated herein include command-based generation and display of personalized composite icons in electronic communication to, among other things, improve the richness of connection between people over electronic media, and to improve the creation and insertion of personalized icons, indicating a desired reaction or activity, in electronic communication.

Embodiments of the present disclosure include a method and system for causing a command-based personalized composite icon to be displayed in a communication stream. The system can include one or more processors and a memory storing computer-executable instructions that, when executed, cause the one or more processors to control the system to perform the following operations, including detecting an action command in a compose field of a first user, wherein the action command indicates a function to be performed by the system, and, responsive to detecting the action command in the compose field, parsing entries from the compose field subsequent to the action command to identify one or more characters succeeding the action command. The operations further include analyzing the identified one or more characters from the compose field to determine if the identified one or more characters match a first one or more characters of a username of the first user in the communication stream and, responsive to determining that the identified one or more characters match the first one or more characters of the username of the first user, entering a personal reaction mode allowing for selection of a personalized composite icon to be displayed in the communication stream, comprising: providing, based upon one or more rules in the personal reaction mode, a set of selectable icons to the first user, the selectable icons indicating a desired reaction of the first user, the one or more rules defining priority or determination of the set of selectable icons; responsive to providing the set of selectable icons, receiving a selected one of the set of selectable icons as a selected icon from the first user; and causing a personalized composite icon comprising a representation of the first user combined with the selected icon to be displayed in the communication stream.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
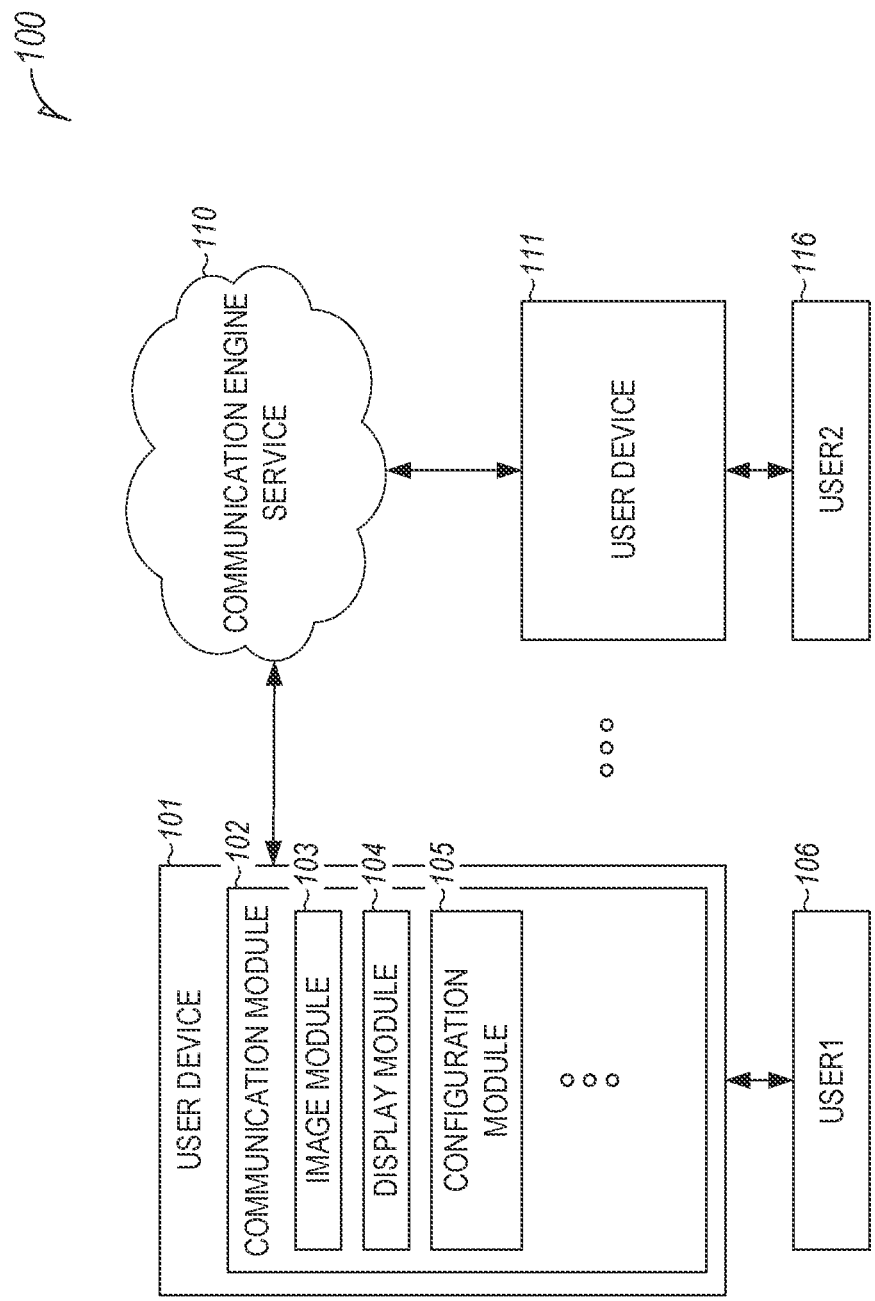
FIG. 1 illustrates an example computer system for providing a communication stream between users.

Text communication lacks the ability to convey emotions and nuanced human behaviors that are perceivable in face-to-face, and even video and voice interactions. Readers are more likely to perceive text communication in their current emotion, and not in the emotion intended by its author. Even two-dimensional video communication cannot provide the full range of emotions and nuanced human behaviors that are perceivable in three-dimensional face-to-face interactions.

Images and emojis can be inserted into communication streams to provide emotional feedback to aid communication or interpretation of text or video interactions. However, conventional images and emojis available for prompt insertion into communication streams lack features that allow a richer emotional connection and feedback, and selection in conventional systems often requires the user to divert focus away from the compose field of a communication platform to navigate predetermined, selectable, or searchable menus of images or emojis, often indexed via a separate search bar or additional selection of categories, and selected or inserted through an additional tap, mouse click, selection, or other manual input from outside of the compose field.

Managing, navigating, and selecting between a growing number of different selectable menus of images or emojis has become increasingly difficult and time consuming, particularly for users of small devices with limited screen space, distracting the focus of the user from communication in the communication stream, in certain examples requiring enormous screen space, or requiring navigation of many menus. A growing technical problem exists in managing, navigating, and selecting between the growing number of different selectable menus of images or emojis, exacerbated by the increase in text communication in different mediums.

The present inventor has recognized, among other things, systems and methods to provide command-based generation, selection, and display of personalized composite icons or templates, indicating desired reactions or activities of a first user, in communication streams. Communication streams can include text streams (e.g., text messaging, email communication, etc.), video streams (e.g., video calls, etc.), or one or more communication threads between two or more users, such as of a conversation group in a communication interface or platform.

A technical solution contemplated herein provides an automated, rule-based system for providing command-based generation of personalized composite icons of a first user for communicating an emotion or intended emotion of the first user in a communication stream in response to an action command, in certain examples, without the first user navigating or moving away from traditional character entry in the compose field. An additional technical solution contemplated herein provides rule-based generation, selection, and display of personalized icons, specific to a personal representation of the first user, such as by incorporating a representation of the first user, such as an avatar or profile picture of the first user, with a reaction or emoji for insertion into the communication stream, improving the communication functionality of the electronic systems and selection, navigation, and incorporation of non-textual content into the communication stream.

The action command can include a character, a symbol, or combination of characters or symbols indicating a desired action, or one of a set of desired actions, of the first user. In an example, the action command can include an "@" symbol, followed by (e.g., directly or immediately succeeding) one or more characters (e.g., a first one or more characters) of a username of the first user typing, entering, or providing the action command in the command box. Characters generally include letters, numbers, or symbols, such as selectable by a first user using a keyboard. In response to receiving the action command and the one or more characters of the username of the first user, the system or method can compose or provide a first set of selectable personalized composite icons to the first user for selection and insertion into the communication stream. The personalized composite icons can include an avatar, a picture, or a representation of the first user (e.g., selected by the first user, such as a profile picture, etc.), in combination with an emoji, an emotion, or an intended emotion of the first user (e.g., a selectable one or more of a set of emojis or emotions). A computer implemented system and method provides a technical solution that composes, selects, and displays, based on one or more rules, a set of personalized composite icons to the first user for further selection and display in the communication stream.

In contrast, conventional systems require separate navigation of multiple menus of either predefined or text searchable menus, or individual creation or customization of emojis, each diverting focus of the first user from the compose field and the communication stream, and often requiring manual input from the first user at a separate location from the compose field.

A further technical solution contemplated herein provides selection between multiple modes depending on one or more characters received immediately following an action command. In an example, a first mode can include a conventional response to the action command, and a second mode can include a different, personal response to the action command described above. For example, if the action command includes the "@" symbol, receiving the "@" symbol and one or more character can trigger one of the first or second modes, depending on the character or combination of characters entered after or succeeding the "@" symbol. The first mode can include a conventional "@mention" response triggered in response to receiving the "@" symbol and one or more characters (e.g., different than a first one or more characters of the username of the first user providing the "@" symbol). A list of users starting with that character in either the existing communication stream, available to the first user providing the action command, or available to be added to the existing communication stream can be generated and presented to the first user for insertion into the communication stream. Mentioned users can be notified, and in certain examples, added, if not already a user of the communication stream. The generated list of users can be further narrowed and sorted with each additionally received character following the "@" symbol until the first user makes a selection, exhausts the list of users, or exits the function of the conventional "@mention" response, such as by entering backspace, left arrow, delete, or escape symbols, selecting away from the generated list, etc. Traditional autocomplete suggestions can be made to complete the username according to one or more rules, such as giving priority to users already members or participants in the communication stream, or scoring by one or more other factors, such as a history of the first user, an amount of participation in the communication stream, etc.

In contrast, the second mode can include the personal response to the action command triggered in response to receiving the "@" symbol followed by one or more characters of the username of the first user typing, entering, or providing the "@" symbol in the compose field. In other examples, the second mode may not be triggered until a number of successive characters of the username of the first user, such as a first two, three, or four successive characters of the username of the first user, are received, such as to balance use of the different modes. In yet other examples, the second mode can be triggered when enough characters are entered following the "@" symbol to narrow the available list of users to the user typing, entering, or providing the "@" symbol in the communication stream. In certain examples, the number of required successive characters of the username of the first user typing, entering, or providing the "@" symbol to trigger the second mode can be dynamic based on usage of the first and second modes by the first user in this or other communication streams. If the first user seldomly uses the second mode, more successive characters of the username of the first user can be required to trigger the second mode. In contrast, if the first user more frequently uses the second mode, if the last use of the action command of the first user was with the second mode, or the recent or short-term use of the second mode of the first user is increasing with respect to use of the first mode, fewer successive characters of the username may be required to trigger the second mode. For example, if the last use of the action command was associated with the second mode (and not the first mode), only the "@" symbol and a first character of the username of the first user typing, entering, or providing the "@" symbol may be required to trigger generation of the first set of selectable personalized composite icons for selection and insertion into the communication stream.

In certain examples, the second mode can transition to the first mode by receiving one or more additional characters the same as or different than the following successive characters in the username of the first user typing, entering, or providing the "@" symbol in the communication stream. In one example, once the second mode is initially triggered and the first set of selectable personalized composite icons are generated and provided to the first user, additional character entry in the compose field can transition away from the second mode, such as back to the first mode, or to a different third mode (e.g., automated text suggestion, display of entered characters only, etc.). In another example, once the second mode is initially triggered and the first set of selectable personalized composite icons are generated or provided to the user, additional character entry can filter or sort the set of selectable personalized composite icons provided to the first user, in certain examples, before the username of the first user is complete in the compose field. In this example, exit from the second mode, or transition from the second mode to the first mode or to the third mode, etc., can require entry of a backspace, left arrow, delete, or escape symbol, or selection away from the generated list.

In other examples, the second mode can be triggered and distinguished from the first mode by a specific set or sequence of characters, such as "@me" or "@me" followed by an enter or return character.

An additional technical problem exists in that scheduling or activating additional activities (e.g., features, actions, etc.) between users (inside or separate from the communication stream) requires navigating or diverting focus away from the compose field and the communication stream for the one or more users invoking or interacting with the additional activities.

A technical solution contemplated herein provides an automated, rule-based system for providing command-based activation or generation of additional activities, such as by generation, selection, and display of one or more personalized templates by a first user between one or more additional users in a communication stream in response to an action command, in certain examples, without the first user navigating or moving away from traditional character entry in a communication stream, such as from a compose field, etc.

In an example, a first user can type, enter, or provide an action command in a compose field, such as an "@" symbol, followed by one or more characters of a username of a second user, an intended recipient of the additional activity (e.g., feature, action, etc.) in the communication stream. In response to receiving the "@" symbol and one or more characters of the username of the second user, a first set of selectable templates can be generated and provided to the first user for selection and engagement with the intended recipient in the communication stream. The additional activities (e.g., features, actions, etc.) can include, among other things, a selectable one or more of: booking a restaurant, pulling in calendars for both users to find an available time or date, activating a voice or video communication, booking a flight or hotel, sharing a file, activating a game or other application, or one or more other activities, separately from or in combination with a reaction, such as one or more of an emoji, an emotion, or an intended emotion of the user (e.g., a selectable one or more of a set of emojis or emotions).

FIG. 1 illustrates an example computer system 100 for providing a communication stream between users, such as a first user (USER1) 106 of a first user device 101 and a second user (USER2) 116 of a second user device 111. The first user 106 and the second user 116 can communicate, using the first and second user devices 101, 111, directly or indirectly, through a communication engine service 110. The communication engine service 110 can manage communication streams, including emails, documents, chats, comments, texts, images, animations, hyperlinks, or voice or video communication for a group of users, such as of one or more communication platforms, through connected devices, such as the first and second user devices 101, 111 or any number of additional authorized devices and users. Groups of users can include organized groups, subgroups, or channels of employees within an organization, or other self-organized groups of users inside or outside of an organization or between multiple organizations. In an example, the communication module 102 can include one or more communication platforms (e.g., Microsoft Teams, Skype, etc.) installed on or accessible to a respective user device, or the communication module 102 can include hardware and software configured to enable the one or more communication platforms to communicate to or from the respective user device.

The first user device 101 is exemplary, and can include a communication module 102 configured to communicate with one or more additional devices, such as the second user device 111, either directly or through the communication engine service 110. The communication module 102 can be configured to send or receive information to or from the communication engine service 110. The communication module 102 can include an image module 103, a display module 104, a configuration module 105, or one or more other modules.

The image module 103 can be configured to send, receive, or store images associated with the communication engine service 110. In certain examples, the images can include icons, such as emojis, representations of emotions (e.g., emoticons), pictures, drawings, avatars, profile pictures, representations of one or more users, etc. In certain examples, the image module 103 can include a repository of images of the first user device 101 or otherwise associated with the first user 106 (e.g., cloud-based storage, online profiles, etc.). The display module 104 can be configured to display messages and other visual content associated with the communication module 102, such as using a display or portion of a display of the first user device 101. The configuration module 105 can be configured to receive, store, and maintain one or more of device or user profiles, including selected user settings or preferences, previous user selections, or one or more other settings or preferences of the first user 106 or one or more other users, such as associated with a communication stream of the communication engine service 110, etc. In other examples, the one or more device or user profiles can be stored or maintained in a data structure or database of or accessible by the communication engine service 110.

Figure 2:
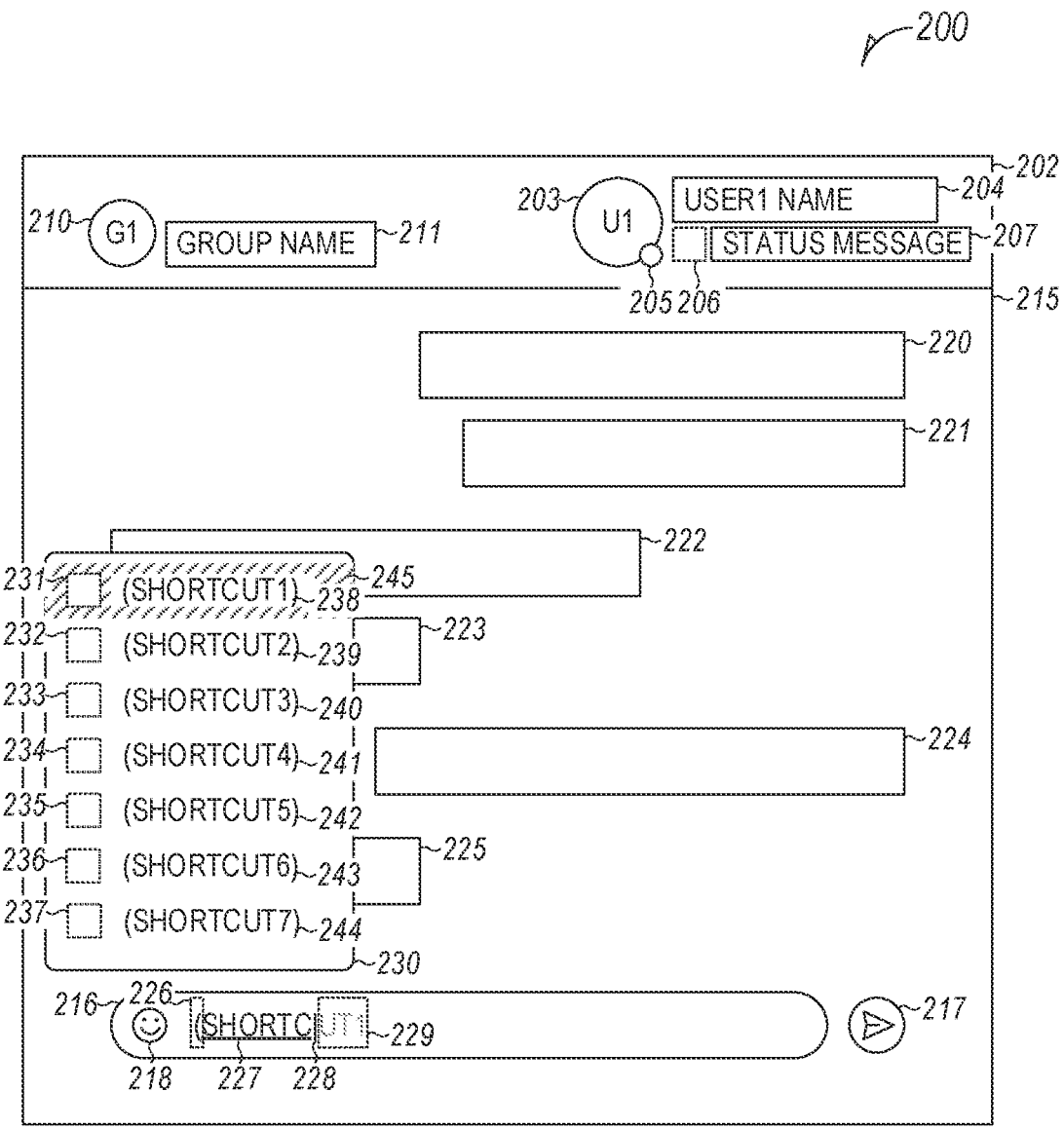
FIG. 2 illustrates an example user interface of a communication platform including a shortcut menu.

FIG. 2 illustrates an example user interface 200 of a communication platform for a first user including a shortcut menu 230 triggered by entry of a short-code 226 in a compose field 216. The short-code 226 illustrated in FIG. 2 is an open parentheses "(" character. Other example short-codes include a colon (":"), double-colon ("::"), open bracket ("["), or at symbol ("@").

The shortcut menu 230 includes a set of one or more shortcuts, illustrated in FIG. 2 as emojis 231-237 and respective text descriptions ("(SHORTCUT1)"-"(SHORTCUT7)") 238-244. The set of one or more shortcuts selected for display or provided in the shortcut menu 230 can be filtered from a larger plurality of available shortcuts, sorted and selected according to, among other things, text descriptions of the respective emojis matching one or more characters 227 from the compose field 216 following the short-code 226, such as between the short-code 226 and a cursor 228, directly succeeding the short-code 226. For example, if the one or more characters 227 from the compose field 216 between the short-code 226 and the cursor 228 include or consist of the text characters "SA", the set of one or more shortcuts can include emojis having corresponding text descriptions starting with or containing the text characters "SA", such as: "SAD", "SALT", "SAKE", "SARI", "SANTA", "SALAD", "SADCAT", "SANDER", etc.

The shortcut menu 230 can include a highlighted selection 245, initially (without additional user input) a default selection, a highest rated selection, a most-recent selection, or a closest match to the one or more characters 227 from the compose field 216 following (or directly succeeding) the short-code 226. The highlighted selection 245 can change upon input by the first user, such as by a filter or sort associated with additionally received one or more characters in the compose field 216, selection characters (e.g., an up arrow, a down arrow, etc.), or selection of a shortcut or movement of a user input over the shortcut menu 230.

The compose field 216 can include autocomplete characters 229 of the highlighted selection 245 after the cursor 228, in certain examples having a different font than the one or more characters 227 entered by the first user in the compose field 216 until the autocomplete characters 229 are optionally accepted by the first user, such as by a selection character (e.g., a right arrow, a tab character, etc.). Selecting a shortcut from the shortcut menu 230, entering all characters of a shortcut of the shortcut menu 230 in the compose field 216 following the short-code 226, or entering a selection character to select the highlighted selection 245 or autocomplete characters 229 (e.g., a right arrow selection character, a tab character, etc.) can automatically fill the compose field 216 with the selected shortcut or a representation of the selected shortcut to be displayed in the communication stream upon selection of a send button 217 or other send action or character (e.g., an enter or return character from an active cursor in the compose field 216, etc.).

The user interface 200 additionally includes a header portion 202 having a number of configurable fields, including an avatar (U1) 203 of the first user, a username ("USER1 NAME") 204 of the first user, a status badge 205 indicating a current status of the first user (e.g., online, available, offline, unavailable, etc.), a custom emoji 206 of the first user, a status message 207 of the first user, a group avatar (G1) 210 for a group associated with the communication thread, and a group name 211 of the group. The body portion 215 includes right- and left-justified messages of a communication thread, the compose field 216, and a send button 217. The right-justified messages (e.g., messages 220, 221, and 224) include messages of the first user, for example, entered in the compose field 216 and sent upon selection of the send button 217 or other send action or character. The left-justified messages (e.g., messages 222, 223, and 225) include messages of one or more users separate from the first user. The compose field 216 optionally includes an emoji field 218, selection of which requires user input and selection away from the compose field 216 (e.g., a mouse or touch-screen interface, etc.), and launches a separate emoji menu, diverting focus of the first user and the active cursor away from the compose field 216.

In an example, the communication thread illustrated in the body portion 215 of the user interface 200 of the communication platform can be one thread of a communication stream of a group of users comprising the first user (e.g., an organization or larger group of users, etc.). The communication stream can include data from the communication thread or a number of communication threads, in certain examples, including communication threads from a number of different communication platforms, from the group of users. For example, a communication thread can include a conversation between a first user of an organization and a second user, whereas a communication stream can include all communication of the first user or the organization on this communication platform or a number of communication platforms.

Figure 3A:
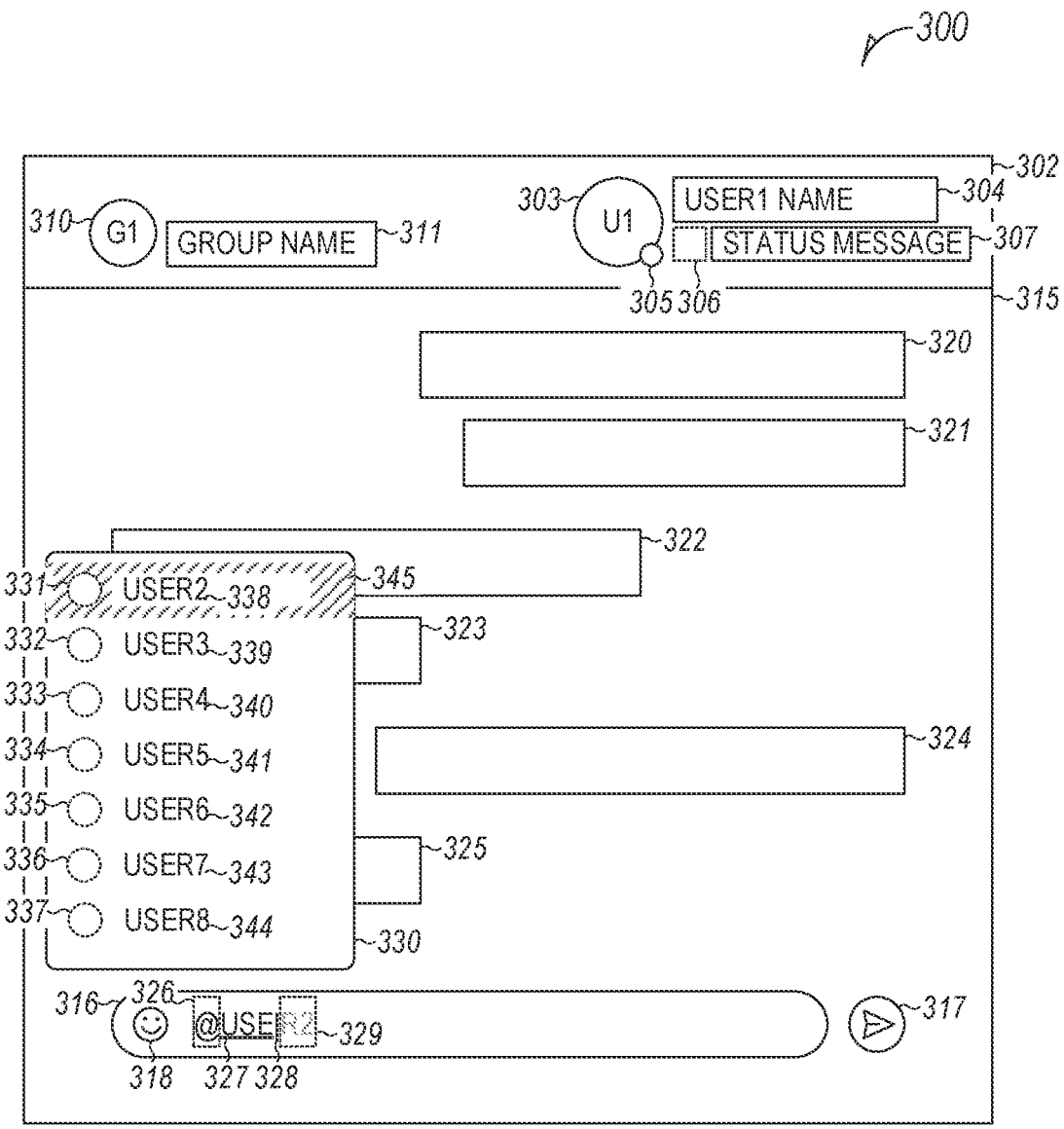
FIGS. 3A-3C illustrate an example user interface of a communication platform including interactions with an "@mention" menu.
Figure 3B:
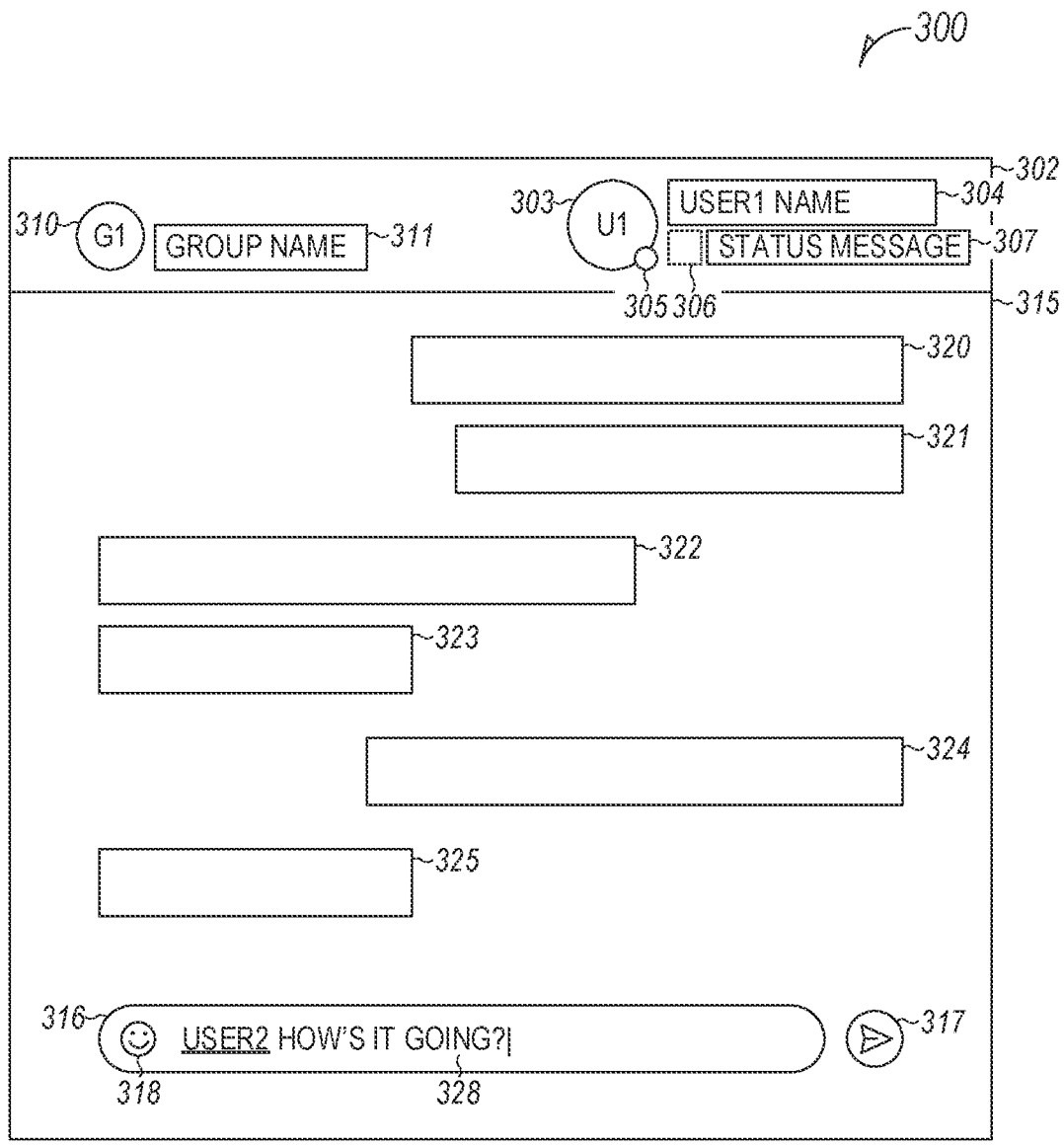
Figure 3C:
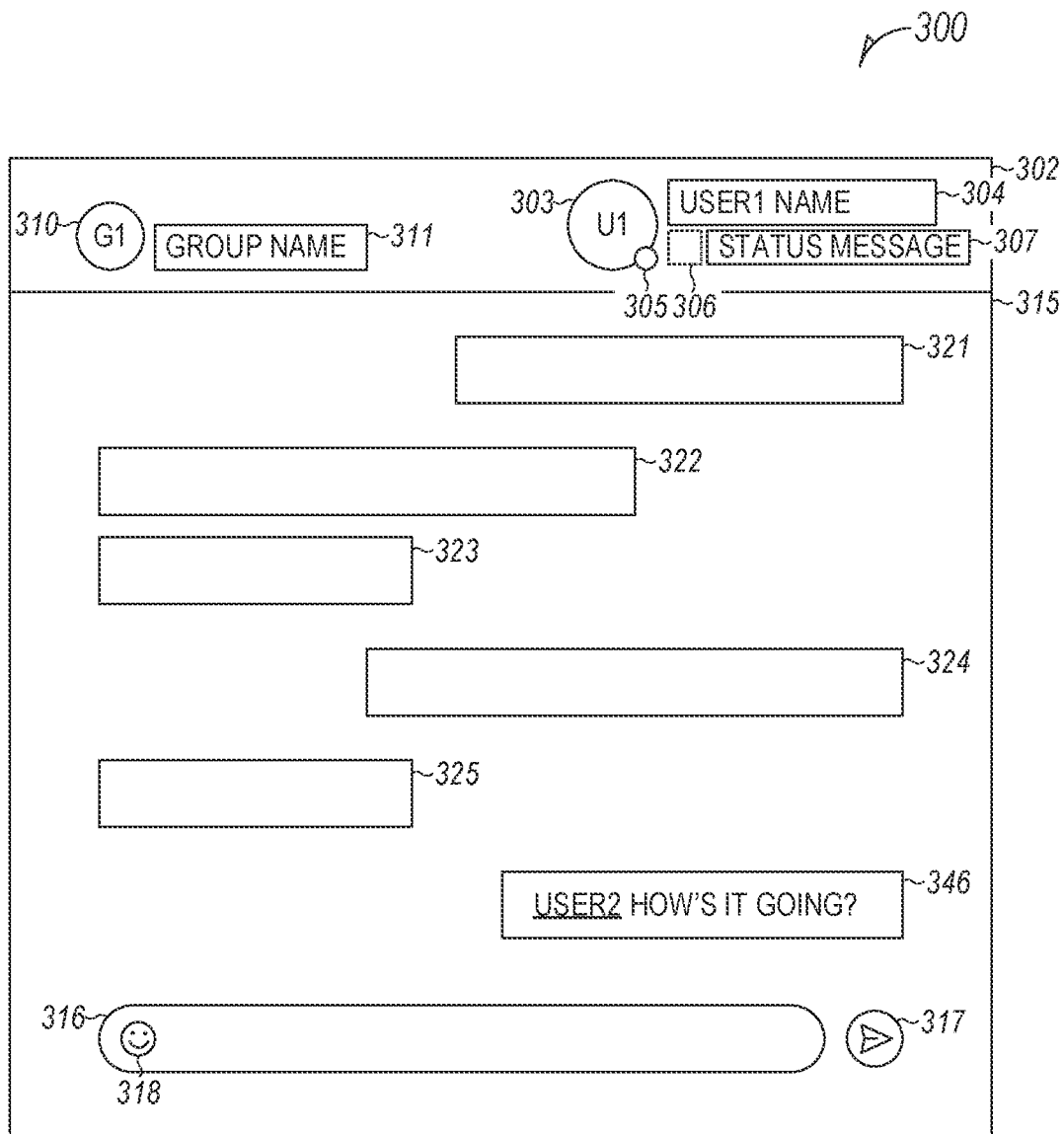

FIGS. 3A-3C illustrate an example user interface 300 of a communication platform of a first user including interactions with an "@mention" menu 330 triggered by entry of an at symbol ("@") short-code 326 in a compose field 316.

The user interface 300 includes a header portion 302 having a number of configurable fields, including an avatar 303 of the first user, a username 304 of the first user, a status badge 305, a custom emoji 306 of the first user, a status message 307 of the first user, a group avatar 310 for a group associated with the communication thread, and a group name 311 of the group. The body portion 315 includes right- and left-justified messages of a communication thread, the compose field 316, and a send button 317. The right-justified messages (e.g., messages 320, 321, and 324) include messages of the first user, for example, entered in the compose field 316 and sent upon selection of the send button 317 or other send action or character. The left-justified messages (e.g., messages 322, 323, and 325) include messages of one or more users separate from the first user. The compose field 316 optionally includes an emoji field 318, selection of which requires user input and selection away from the compose field 316, and launches a separate emoji menu, diverting focus of the first user and the active cursor away from the compose field 316.

The "@mention" menu 330 includes a set of one or more users, illustrated in FIG. 3A as avatars 331-337 and respective usernames ("USER2"-"USER8") 338-344. The set of one or more users can be selected from a plurality of users available to (but different from) the first user according to, among other things, the usernames matching one or more characters 327 from the compose field 316 following the "@" short-code 326, such as between the "@" short-code 326 and a cursor 328. The avatars 331-337 can include selected avatars or profile pictures representative of or associated with the respective one or more users. The plurality of users available to the first user can include one or more users of or associated with the group or otherwise available to the first user in the communication stream. For example, if the one or more characters 327 from the compose field 316 between the "@b." short-code 326 and the cursor 328 include the text character "S", the set of one or more users can include users available to the first user having respective usernames starting with the text character "S" at some major portion, including a first letter of a first name or a last name associated with the username, a first character of the username, a first character of an email address associated with the username, etc.

The "@mention" menu 330 can include a highlighted selection 345, initially (without additional user input) a default selection, a highest rated selection, a most-recent selection, or a closest match to the one or more characters 327 from the compose field 316 following (or directly succeeding) the "@" short-code 326. The highlighted selection 345 can change upon input by the first user, such as by a filter or sort associated with additionally received one or more characters in the compose field 316, selection characters (e.g., an up arrow, a down arrow, etc.), or selection of a username or movement of a user input over the "@b.mention" menu 330.

The compose field 316 can include autocomplete characters 329 of the highlighted selection 345 after the cursor 328, in certain examples having a different font than the one or more characters 327 entered by the first user in the compose field 316 until the autocomplete characters 329 are optionally accepted by the first user, such as by a selection character (e.g., a right arrow, a tab character, etc.). Selecting a user from the "@mention" menu 330, entering all characters of a username of the "@mention" menu 330 in the compose field 316 following "@" short-code 326, or entering a selection character to select the highlighted selection 345 or autocomplete characters 329 (e.g., a right arrow selection character, a tab character, etc.) can automatically fill the compose field 316 with the username of the selected user or a representation of the selected user to be displayed in the communication stream upon selection of a send button 317 or other send action or character (e.g., an enter or return character from an active cursor in the compose field 316, etc.). In addition to displaying the username of the selected user in the communication stream, separate notification of the "@mention" in the communication stream can be provided to the selected user, separate from the communication thread.

After selecting a user, an additional character message can optionally be input in the compose field 316. For example, in FIG. 3B, the second user ("USER2") 338 has been selected and an additional character message "HOW'S IT GOING?" has been entered in the compose field 316. FIG. 3C illustrates an additional right-justified message 346 including the displayed username of the selected user and the additional character message.

In an example, the communication thread illustrated in FIG. 3B can include a chat interface of a communication platform between the first and second users. In an example, the separate notification of the "@b.mention" in the communication stream can include a notification to one or more different devices of the second user, such as a desktop notification separate from the or in addition to the communication thread, a notification on the communication platform, a mobile notification, or an email communication to the second user separate from the chat interface illustrated in FIG. 3B.

FIGS. 4A-4E illustrate an example user interface 400 of a communication platform of a first user including interaction with a selectable icon menu 430 in a personal reaction mode triggered by entry of an action command 426 in a compose field 416 followed by one or more characters of a username of the first user. In contrast to the "@mention" menu 330 of FIGS. 3A-3C directed to a second user, the selectable icon menu 430 is directed to the first user and enables selection of a command-based personalized composite icon to be displayed in a communication stream, without diverting the focus or active cursor of the first user away from the compose field 416 of the communication platform, and in certain examples without the hands of the first user leaving the keyboard and without prior custom setup. In certain examples, the personal reaction mode can be triggered upon entry of the action command 426 and a first one or more characters of the username of the first user, a first or last name of the first user, or an email address associated with the first user. In other examples, to distinguish from different users having the same first one or more characters, the username of the first user must be completely entered or accepted following the action command 426 to trigger the personal reaction mode.

The action command 426 can include a symbol, such as a keyboard symbol, including a specific one or more of an at symbol ("@"), an open bracket ("["), an open parentheses ("("), a colon symbol (":"), one or more other symbols, one or more double symbols (e.g., "@@", "[[", "((", "::", etc.), or combinations of different symbols. The command-based personalized composite icon can include a representation of the first user, such as an avatar or profile picture combined with a selected icon indicating a desired reaction of the first user. In certain examples, selection of an icon, such as for display in the communication stream or as one of a set of selectable icons, can trigger generation of the personalized composite icon.

The user interface 400 includes a header portion 402 having a number of configurable fields, including an avatar 403 of the first user, a username 404 of the first user, a status badge 405, a custom emoji 406 of the first user, a status message 407 of the first user, a group avatar 410 for a group associated with the communication thread, and a group name 411 of the group. The body portion 415 includes right- and left-justified messages of a communication thread, the compose field 416, and a send button 417. The right-justified messages (e.g., messages 420, 421, and 424) include messages of the first user, for example, entered in the compose field 416 and sent upon selection of the send button 417 or other send action or character. The left-justified messages (e.g., messages 422, 423, and 425) include messages of one or more users separate from the first user. The compose field 416 optionally includes an emoji field 418, selection of which requires user input and selection away from the compose field 416, and launches a separate emoji menu, diverting focus of the first user and the active cursor away from the compose field 416.

Figure 4A:
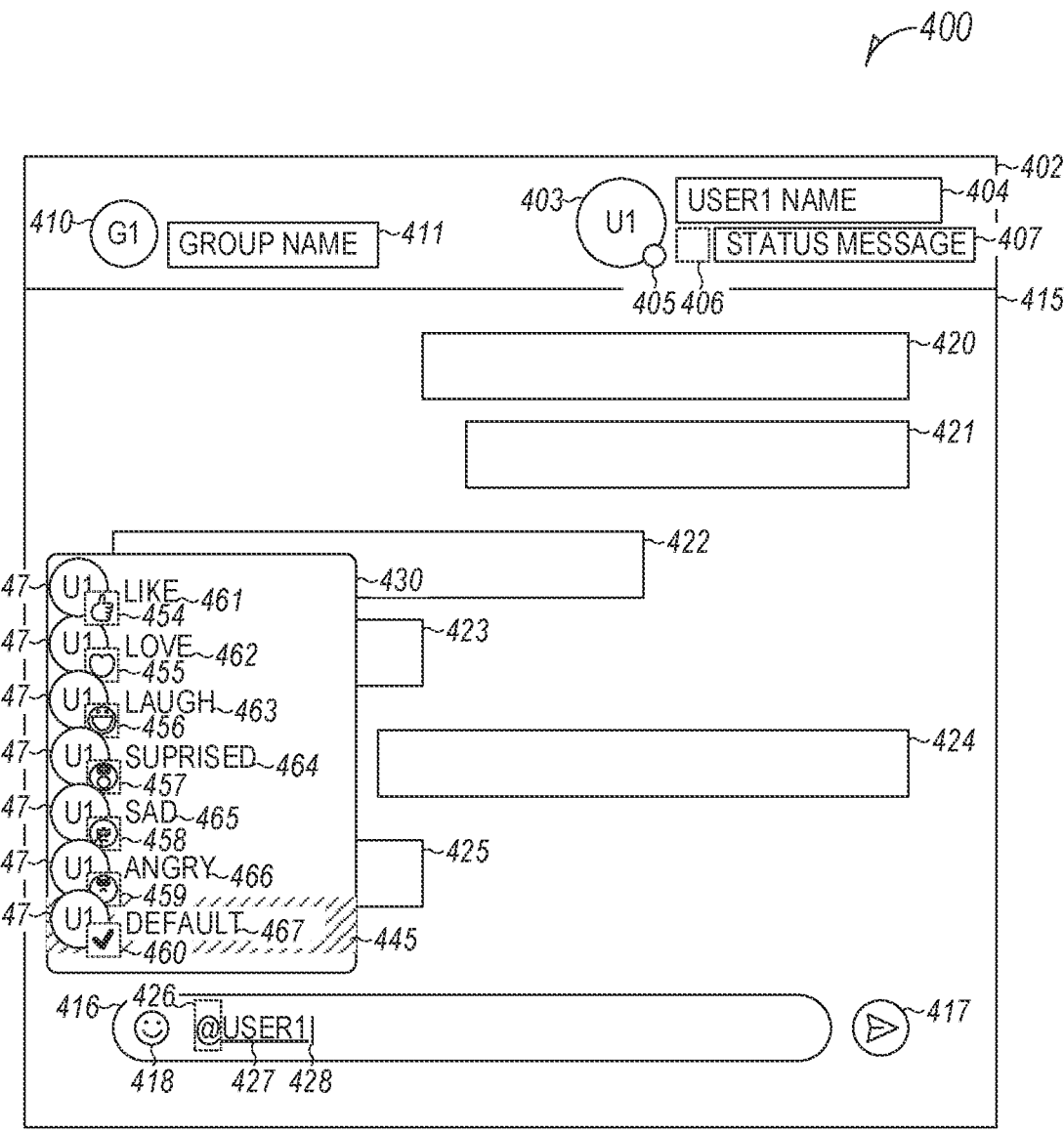
FIGS. 4A-4E illustrate an example user interface of a communication platform including interaction with a selectable icon menu.

The selectable icon menu 430 includes a set of selectable icons, illustrated in FIG. 4A as selectable icons 454-460 and respective text descriptions 461-467. In certain examples, the set of selectable icons can be combined and displayed with a representation of the first user 447, such as an avatar (U1) or a profile picture of the first user, in the selectable icon menu 430. In other examples, the representations of the first user 447 can be omitted from the selectable icon menu 430.

The selectable icons can include a number of different desired reactions of the first user, in certain examples, including emojis or other images configured to convey an emotion or a reaction. The set of selectable icons selected for display or provided in the selectable icon menu 430 can be filtered from a larger plurality of selectable icons. The selectable icons 454-460 illustrated in FIG. 4A can include an initial or default set of selectable icons, corresponding to those most used by the group, by the first user, by users of the communication stream, etc. The set of selectable icons in the selectable icon menu 430 can be further narrowed or sorted by user preference or entry of additional characters (e.g., according to text descriptions of the respective selectable icons matching one or more additional characters from the compose field 416 following the username of the first user, etc.).

The selectable icons 454-460 in FIG. 4A include a thumbs-up emoji 454, a heart emoji 455, a laughing emoji 456, a surprised emoji 457, a sad emoji 458, an angry emoji 459, and a default emoji 460, each having associated respective text descriptions 454-460. In other examples, the set of selectable icons can include one or more other emojis, icons, or reactions, including more, less, or different selectable icons than illustrated in FIG. 4A.

Figure 4B:
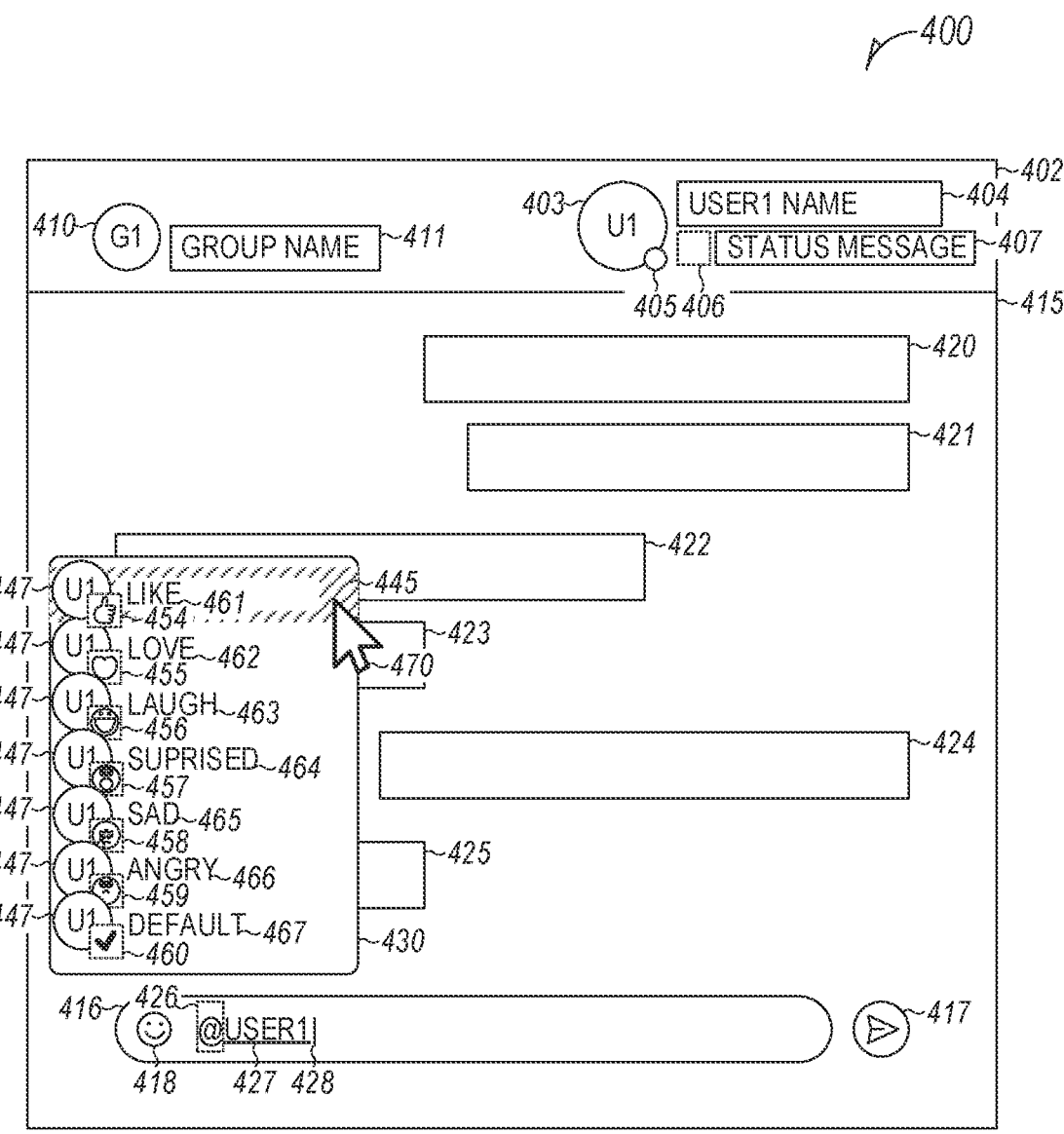

The selectable icon menu 430 can include a highlighted selection 445, initially (without additional user input) a default selection, a highest rated selection, a most-recent selection, or a closest match to an additional one or more characters in the compose field 416 following the username of the first user. The highlighted selection 445 can change upon input by the first user, such as by a filter or sort associated with the additional one or more characters in the compose field 416, selection characters (e.g., an up arrow, a down arrow, etc.), or selection of a selectable icon or movement of a user input 470 over the selectable icon menu 430, such as illustrated in FIG. 4B. Selection of a selectable icon, such as by the user input 470 (e.g., a mouse click, a long tap, a double-tap, etc.), can cause the compose field 416 to autofill the selection, or in certain examples cause the selected icon to be displayed in the communication stream.

Figure 4C:
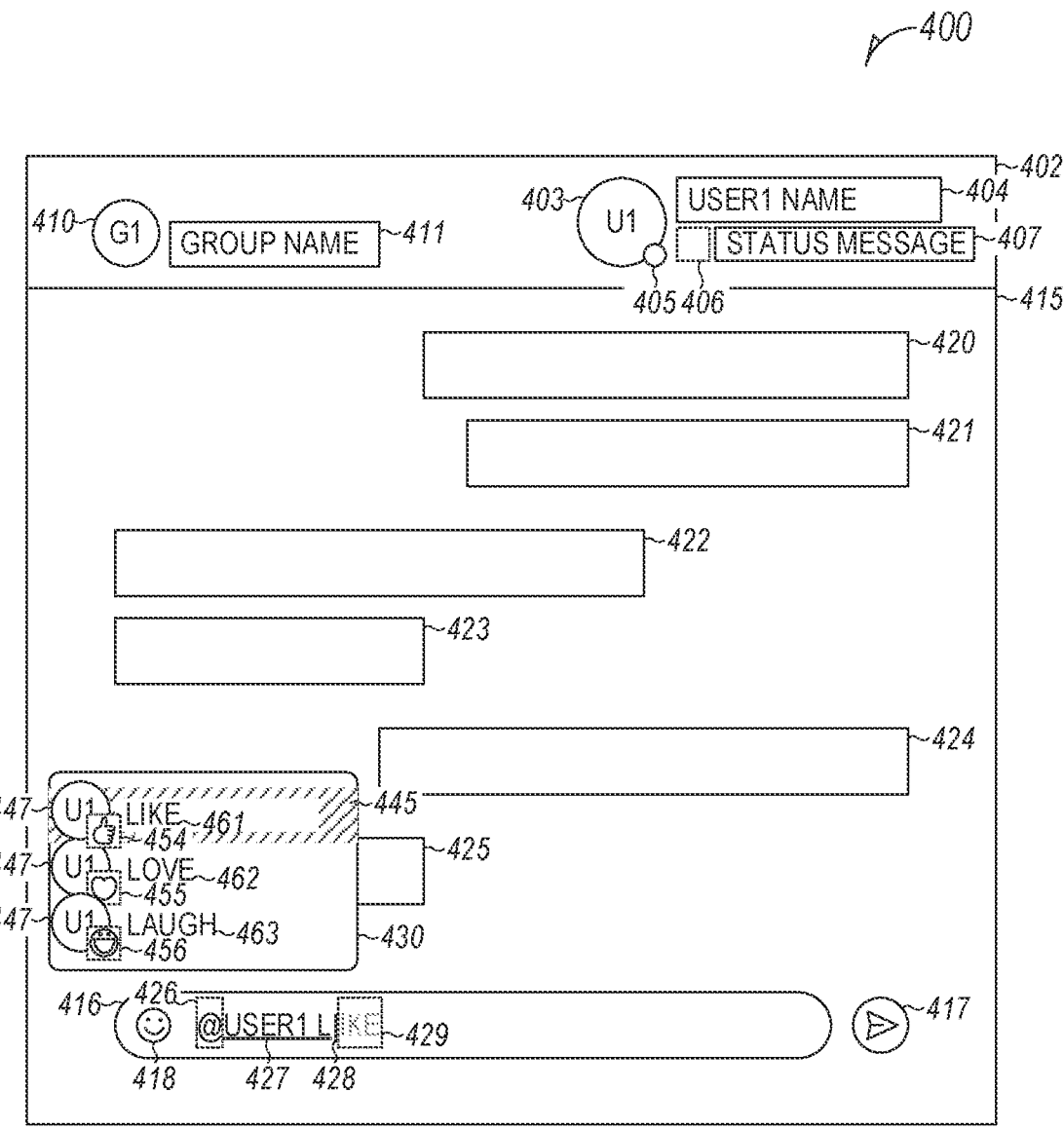

The one or more characters 427 in the compose field 416 following the action command 426 and before a cursor 428 in FIG. 4C include an additional one or more characters directly following the username of the first user ("USER1"), including a space symbol and the character "L". The set of selectable icons of the selectable icon menu 430 can be sorted or updated to include selectable icons having text descriptions starting with (or containing) the additional one or more characters (in certain examples, disregarding the space at the beginning of the additional one or more characters following the username). In certain examples, the space symbol following the username is not required, but can be inserted and displayed to aid user comprehension. Accordingly, the selectable icon menu 430 in FIG. 4C is reduced to the selectable icons having text descriptions starting with the letter "L", including "LIKE" 461, "LOVE" 462, and "LAUGH" 463.

Although illustrated herein as only filtering down, in certain examples, the additional one or more characters can re-populate additional selectable icons of the plurality of selectable icons matching the additional one or more characters. In other examples, if no selectable icons having text descriptions starting with or having the additional one or more characters, the characters in the compose field can be presented as they have been received, without a selectable icon. Upon receiving an undo character, such as backspace or a left arrow character, the selectable icon menu 430 can display the previously displayed set of selectable icons (before receiving the additional one or more characters). In an example, if the additional one or more characters includes multiple characters, each undo character can undo one of the multiple characters, starting at the last entered character.

The compose field 416 can include autocomplete characters 429 of the highlighted selection 445 after the cursor 428, in certain examples having a different font than the one or more characters 427 entered or accepted by the first user in the compose field 416 until the autocomplete characters 429 are optionally accepted by the first user, such as by a selection character (e.g., a right arrow, a tab character, etc.). Selecting a selectable icon from the selectable icon menu 430, entering all characters of a username from the selectable icon menu 430 in the compose field 416 following the action command 426 (e.g., in certain examples followed by a space symbol or selection of a space key on a keyboard), or entering a selection character to accept displayed autocomplete characters (e.g., a right arrow selection character, a tab character, etc.), can auto fill the compose field 416 with any remaining characters of the selected username.

Figure 4D:
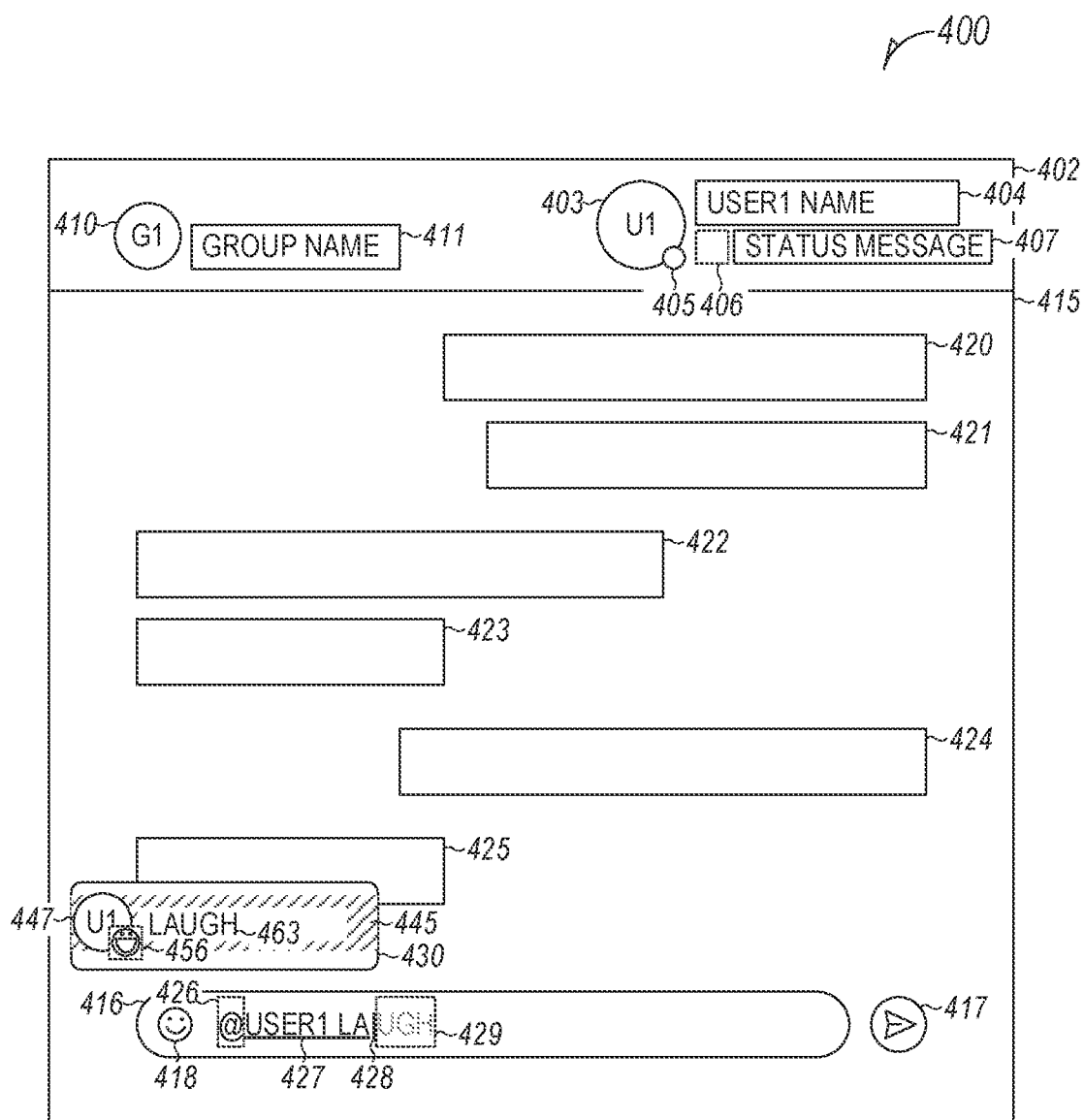
Figure 4E:
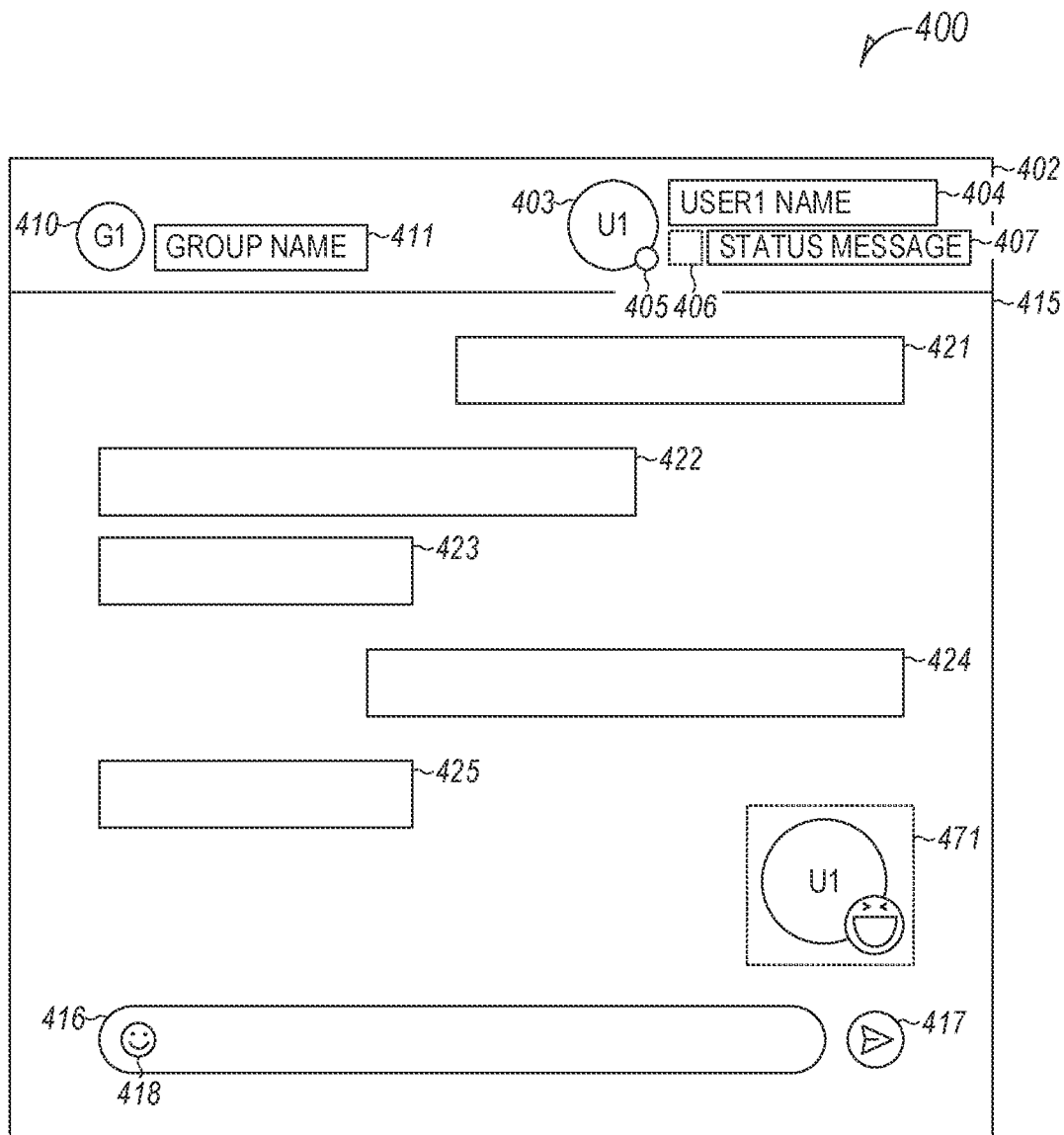

The one or more characters 427 in the compose field 416 following the action command 426 and before the cursor 428 in FIG. 4D include an additional one or more characters directly following the username of the first user, including a space symbol and the characters "LA". The set of selectable icons of the selectable icon menu 430 can be further sorted or updated, now reduced to the selectable icons having text descriptions starting with the letters "LA", including "LAUGH" 463 associated with the laughing emoji 456. The highlighted selection 445 can change as the list is sorted or updated, and the autocomplete characters 429 of the remaining characters of the text description of the highlighted selection 445 can optionally be suggested in the compose field 416 after the cursor 428. A selection character can be entered to accept the autocomplete characters 429 (e.g., a right arrow selection character, a tab character, etc.), and auto fill the compose field 416 with any remaining characters of the selected icon. Selection of the send button 417 or other send action or character can cause a personalized composite icon 471 including the selected icon to be displayed in the communication stream, such as illustrated in FIG. 4E.

In certain examples, the personalized composite icon 471 can be generated and stored prior to generating the selectable icon menu 430 at FIGS. 4A-4D, and the set of selectable icons can include the generated personalized composite icons. In other examples, individual components of the personalized composite icons, including the set of selectable icons, the representation of the first user 447, and text descriptions associated with the set of selectable icons can be stored, and the personalized composite icons can be created after selection of the selectable icon.

Command-based generation of the selectable icons can save storage space and processing power, as the full number of personalized composite icons can be vast, whereas individual pieces of the personalized composite icon are already stored at various locations of the system. Moreover, generation after selection allows the system to provide robust and simple user-specific custom personalization without prior setup, using information typically found in user profiles. In certain examples, instead of distracting the user with a number of composite icons, relatively simple icons can be provided to the first user in the selectable icon menu 430 and the personalized composite icon 471 can be generated after selection. In other examples, respective personalized composite icons can be generated and provided to the user in the selectable icon menu 430. Frequently selected personalized composite icons can be stored for efficient use/recall. However, seldom used or newly added icons can be generated into personalized composite icons only as necessary, reducing initialization time and storage requirements, providing a technical solution to the growing technical problem of expanding cost of user customizations.

FIGS. 5A-5G illustrate an example user interface 500 of a communication platform of a first user including interaction with a selectable template menu 530 in a user selection mode triggered by entry of an action command 526 in a compose field 516 followed by one or more characters of a username different from the first user, such as a second user, and in a template selection mode triggered by selection of the second user, different from the first user, in the user selection mode. In contrast to the "@mention" menu 330 of FIGS. 3A-3C, the selectable template menu 530 enables selection of a command-based personalized composite template to be displayed in a communication stream indicating a desired reaction or activity corresponding to the first and second users, without diverting the focus or active cursor of the first user away from the compose field 416 of the communication platform, and in certain examples without the hands of the first user leaving the keyboard and without prior custom setup. In an example, an embedded function mode including activation of an embedded function allowing for interaction by one or both of the first and second users can be activated by the second user in response to the provided personalized composite template.

The action command 526 can include a symbol, such as a keyboard symbol, including a specific one or more of an at symbol ("@"), an open bracket ("["), an open parentheses ("("), a colon symbol (":"), one or more other symbols, one or more double symbols (e.g., "@@", "[[", "((", "::", etc.), or combinations of different symbols. In certain examples, as selectable templates are frequently time sensitive, indicating desired reactions or activities that are often urgent, a notification of the displayed personalized composite template can be provided to the second user.

The user interface 500 includes a header portion 502 having a number of configurable fields, including an avatar 503 of the first user, a username 504 of the first user, a status badge 505, a custom emoji 506 of the first user, a status message 507 of the first user, a group avatar 510 for a group associated with the communication thread, and a group name 511 of the group. The body portion 515 includes right- and left-justified messages of a communication thread, the compose field 516, and a send button 517. The right-justified messages (e.g., messages 520, 521, and 524) include messages of the first user, for example, entered in the compose field 516 and sent upon selection of the send button 517 or other send action or character. The left-justified messages (e.g., messages 522, 523, and 525) include messages of one or more users separate from the first user. The compose field 516 optionally includes an emoji field 518, selection of which requires user input and selection away from the compose field 516, and launches a separate emoji menu, diverting focus of the first user and the active cursor away from the compose field 516.

Figure 5A:
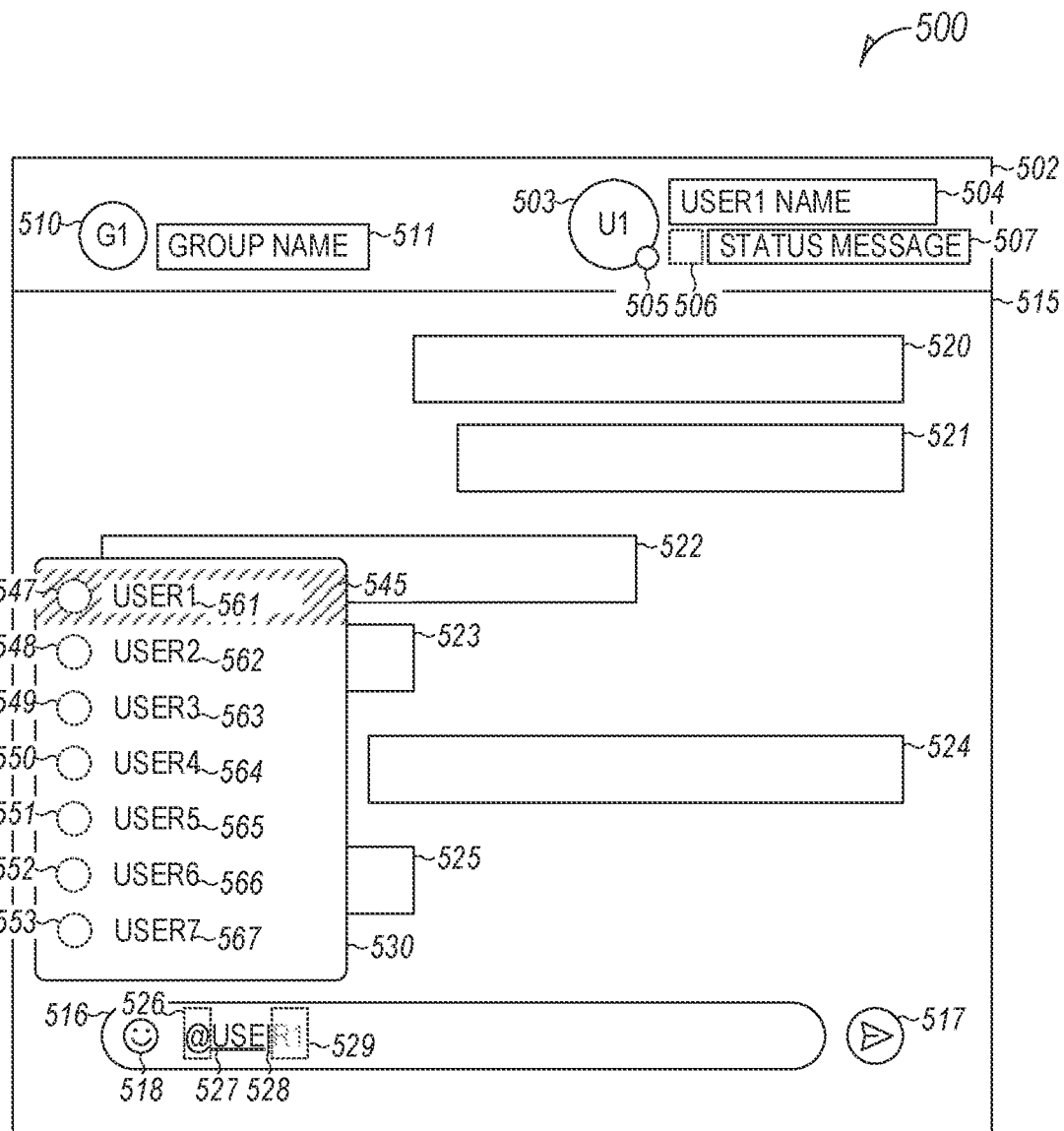
FIGS. 5A-5G illustrate an example user interface of a communication platform including interaction with a selectable template menu.

In the user selection mode, the selectable template menu 530 includes a set of one or more users for selection, illustrated in FIG. 5A as avatars 547-553 and respective usernames ("USER1"-"USER7") 561-567. The set of one or more users can be selected from a plurality of users available to the first user according to, among other things, usernames matching one or more characters 527 from the compose field 516 following the action command 526, such as between the action command 526 and a cursor 528. The avatars 547-553 can include selected avatars or profile pictures representative of or associated with the respective one or more users. The plurality of users available to the first user can include one or more users of or associated with the group or otherwise available to the first user in the communication stream, including the first user. In an example, selection or entry of the first user in the compose field 516 can trigger entry to the personal reaction mode described in FIGS. 4A-4E. In an example, if the one or more characters 527 from the compose field 516 between the action command 526 and the cursor 528 include the text character "S", the set of one or more users can include users available to the first user having respective usernames starting with the text character "S" at some major portion, including a first letter of a first name or a last name associated with the username, a first character of the username, a first character of an email address associated with the username, etc.

The selectable template menu 530 can include a highlighted selection 545, initially (without additional user input) a default selection, a highest rated selection, a most-recent selection, or a closest match to the one or more characters 527 from the compose field 516 following (or directly succeeding) the action command 526. The highlighted selection 545 can change upon input by the first user, such as by a filter or sort associated with additionally received one or more characters in the compose field 516, selection characters (e.g., an up arrow, a down arrow, etc.), or selection of a username or movement of a user input over the selectable template menu 530.

Figure 5B:
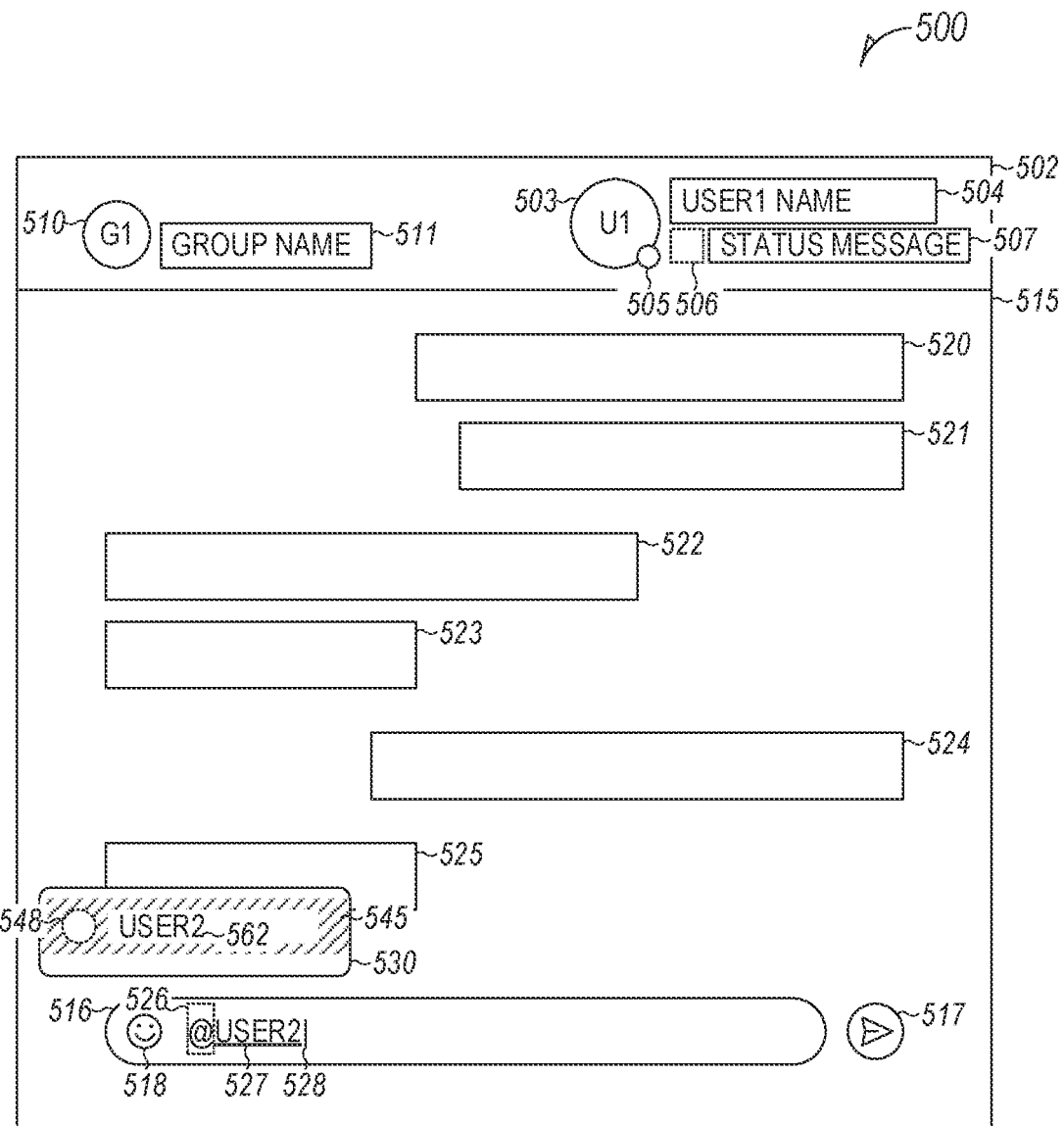

The compose field 516 can include autocomplete characters 529 of the highlighted selection 545 after the cursor 528, in certain examples having a different font than the one or more characters 527 entered by the first user in the compose field 516 until the autocomplete characters 529 are optionally accepted by the first user, such as by a selection character (e.g., a right arrow, a tab character, etc.). Selecting a user from the selectable template menu 530, entering all characters of a username of the selectable template menu 530 in the compose field 516 following action command 526, or entering a selection character to select the highlighted selection 545 or autocomplete characters 529 (e.g., a right arrow selection character, a tab character, etc.) can automatically fill the compose field 516 with the username of the selected user or a representation of the selected user, such as illustrated in FIG. 5B.

Selection of a second user, different from the first user, in the user selection mode triggers entry to the template selection mode. In the template selection mode, the selectable template menu 530 expands to include a set of selectable templates, illustrated in FIG. 5C as selectable templates 572-577 and respective text descriptions 578-583. In certain examples, the set of selectable templates can be combined and displayed with a representation of the first user 547, such as an avatar or a profile picture of the first user, or a representations of the second user 548, such as an avatar or a profile picture of the second user. In other examples, the representations of the first and second users 547, 548 can be omitted from the selectable template menu 530.

The selectable templates can include a number of different templates indicating a desired reaction or activity corresponding to the first and second users, in certain examples, including emojis or other images configured to convey an emotion or a reaction. The set of selectable templates selected for display or provided in the selectable template menu 530 can be filtered from a larger plurality of selectable templates. The selectable templates 572-577 illustrated in FIG. 5C can include an initial or default set of selectable templates, corresponding to those most used by the group, by the first user, by users of the communication stream, etc. The set of selectable templates in the selectable template menu 530 can be further narrowed or sorted by user preference or entry of additional characters (e.g., according to text descriptions of the respective selectable templates matching one or more additional characters from the compose field 516 following the username of the second user, etc.).

Figure 5C:
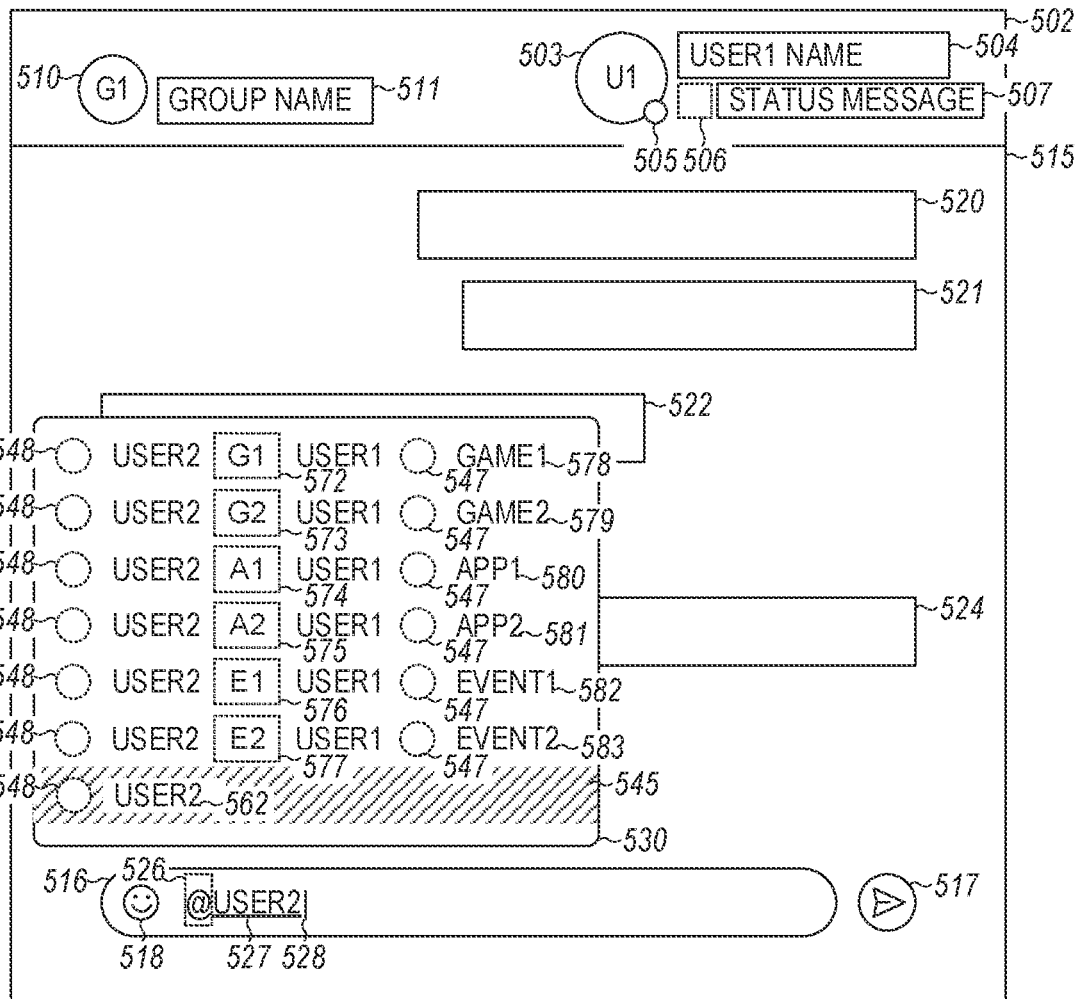

The selectable templates 572-577 in FIG. 5C include a first game template (G1) 572, a second game template (G2) 573, a first application template (A1) 574, a second application template (A2) 575, a first event template (E1) 576, and a second event template (E2) 577, each having associated respective text descriptions 578-583. In other examples, the set of selectable templates can include one or more other templates, including more, less, or different selectable templates than illustrated in FIG. 5C.

The selectable template menu 530 can include a highlighted selection 545, initially (without additional user input) a default selection, a highest rated selection, a most-recent selection, or a closest match to an additional one or more characters in the compose field 516 following the username of the second user. The highlighted selection 545 can change upon input by the first user, such as by a filter or sort associated with an additional one or more characters in the compose field 516, selection characters (e.g., an up arrow, a down arrow, etc.), or selection of a selectable icon or movement of a user input over the selectable template menu 530. Selection of a selectable icon, such as by the user input (e.g., a mouse click, a long tap, a double-tap, etc.), can cause the compose field 516 to autofill the selection, or in certain examples cause the selected icon to be displayed in the communication stream.

In FIG. 5C, the highlighted selection 545 includes only the representation of the second user 548 and respective username ("USER2"). Selection of the highlighted selection 545 in FIG. 5C would trigger exit of the template selection mode and entry of an "@mention" action described in FIGS. 3A-3C with respect to the selected, second user.

Figure 5D:
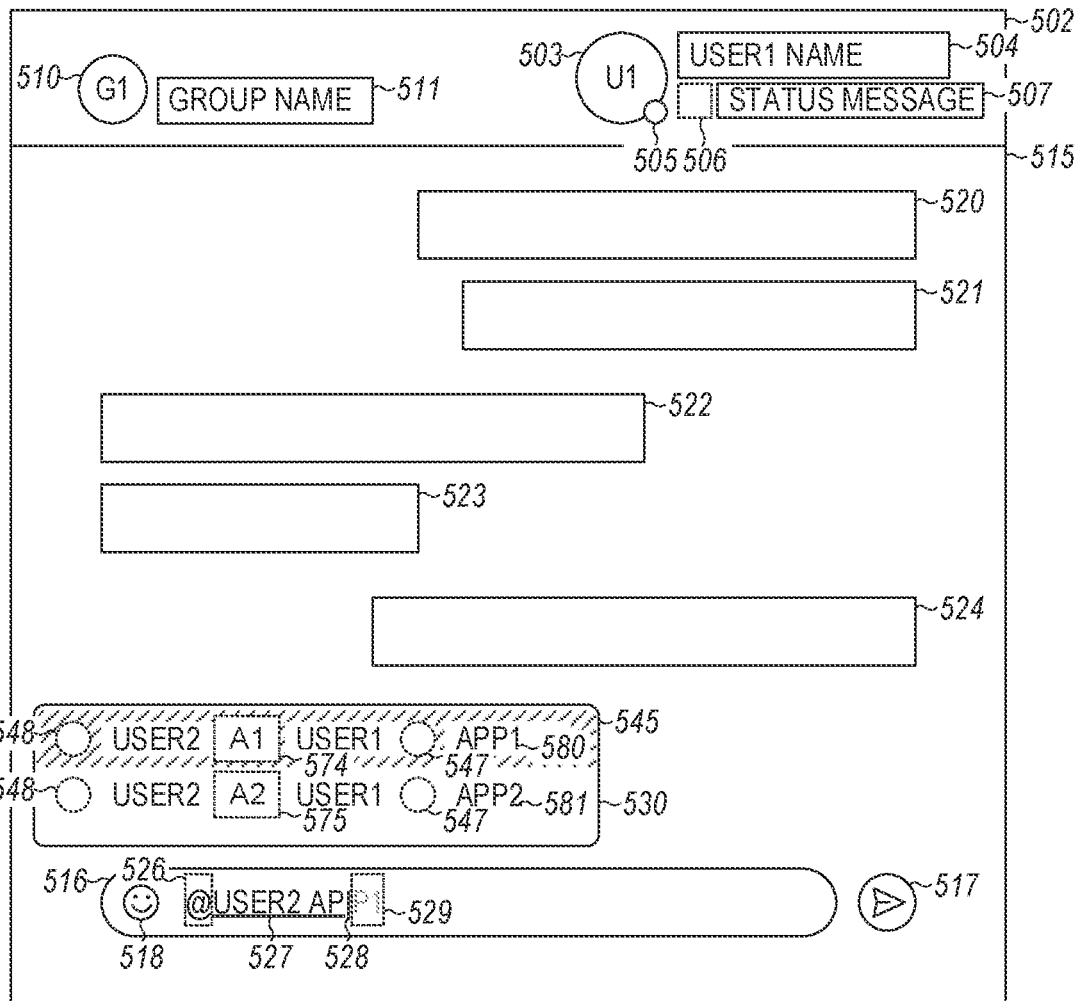

The one or more characters 527 in the compose field 516 following the action command 526 and before the cursor 528 in FIG. 5D include an additional one or more characters directly following the username of the second user ("USER2"), including a space symbol and the characters "AP". The set of selectable templates of the selectable template menu 530 can be sorted or updated to include selectable templates having text descriptions starting with (or containing) the additional one or more characters (in certain examples, disregarding the space at the beginning of the additional one or more characters following the username). In certain examples, the space symbol following the username is not required, but can be inserted and displayed to aid user comprehension. Accordingly, the selectable template menu 530 in FIG. 5D is reduced to the selectable templates having text descriptions starting with the letters "AP", including "APP1" 580 and "APP2" 581.

Although illustrated herein as only filtering down, in certain examples, the additional one or more characters can re-populate additional selectable templates of the plurality of selectable templates matching the additional one or more characters. In other examples, if no selectable templates having text descriptions starting with or having the additional one or more characters, the characters in the compose field can be presented as they have been received, without a selectable template. Upon receiving an undo character, such as backspace or a left arrow character, the selectable template menu 530 can display the previously displayed set of selectable templates (before receiving the additional one or more characters). In an example, if the additional one or more characters includes multiple characters, each undo character can undo one of the multiple characters, starting at the last entered character.

Figure 5E:
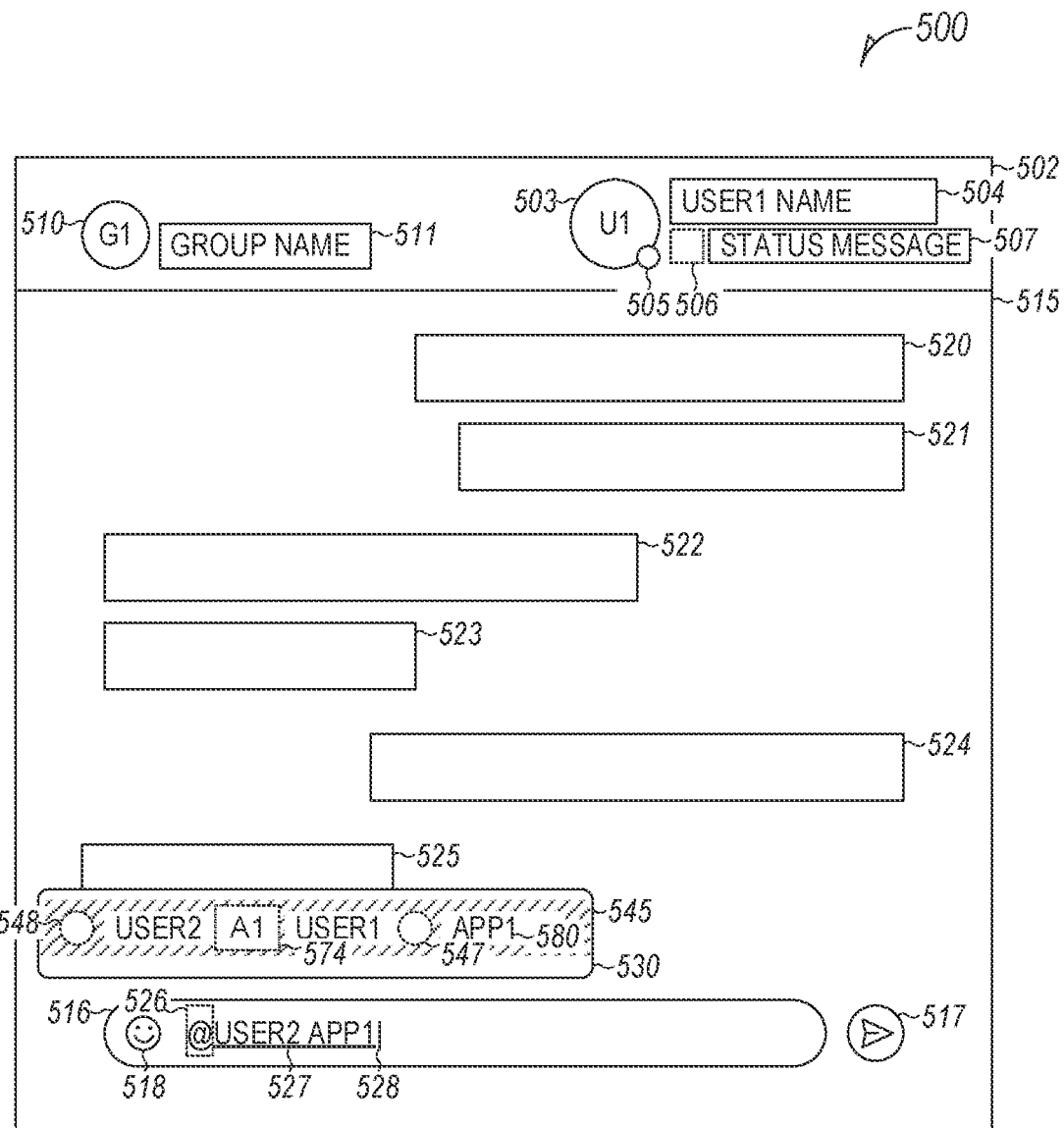
Figure 5F:
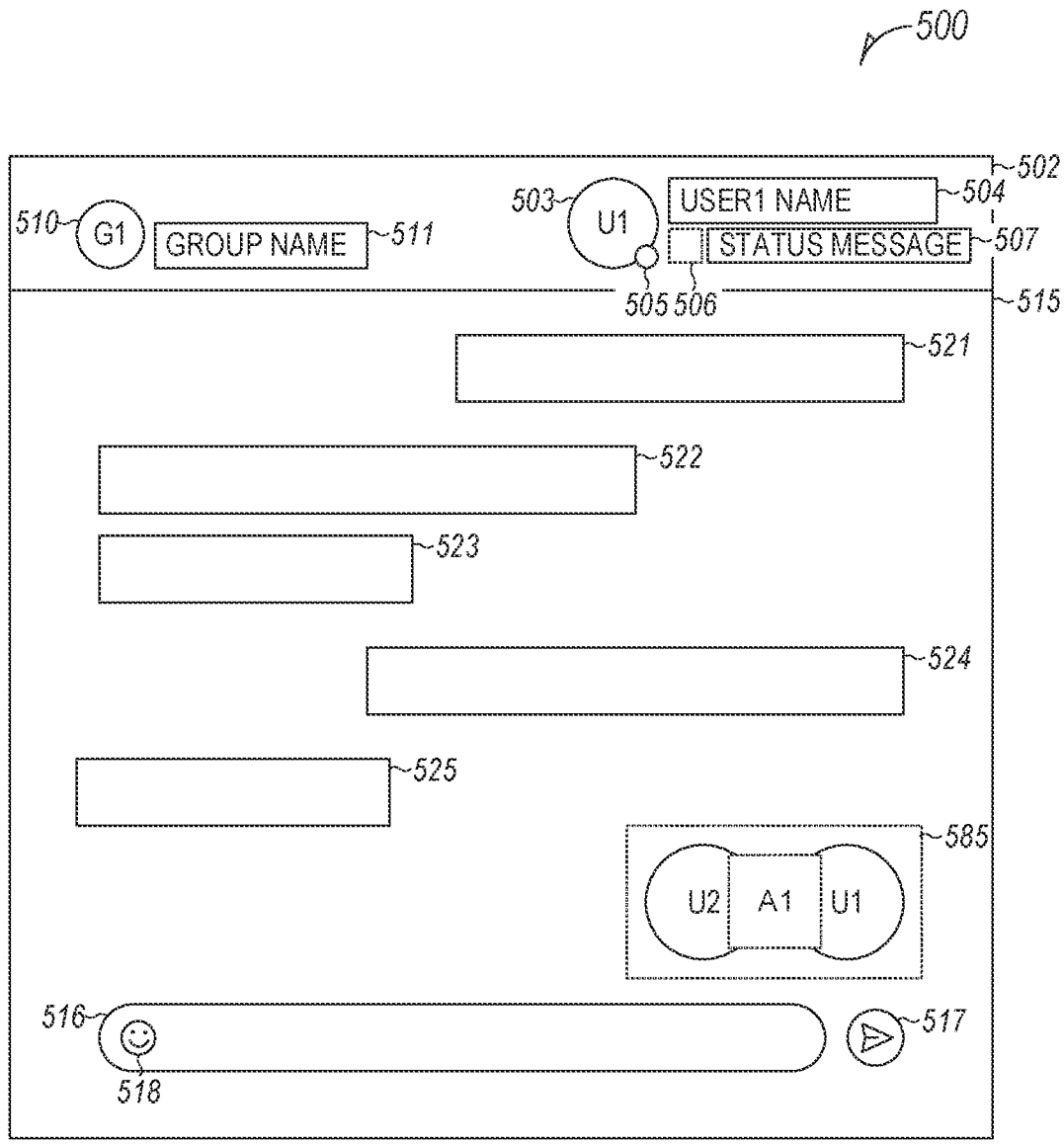

The one or more characters 527 in the compose field 516 following the action command 526 and before the cursor 528 in FIG. 5E include an additional one or more characters directly following the username of the second user ("USER2"), including a space symbol and the characters "APP1". The set of selectable templates of the selectable template menu 530 can be further sorted or updated, now reduced to the selectable template A1 574 having the text description "APP1" 580. Selection of the send button 517 or other send action or character can cause a personalized composite template 585 including the selected template to be displayed in the communication stream, such as illustrated in FIG. 5F.

In an example, the personalized composite template 585 can include an embedded control, selectable or invocable by the second user from the communication stream, such as by click, selection, or tap of the personalized composite template 585 on a user device, an affirmative voice input (e.g., "yes", "sure", etc.), an affirmative gesture input (e.g., "shaking head yes"), or an affirmative text input (e.g., "yes", "sure", "I'm game", etc.) by the second user, receivable by the communication platform or detectable by one or more other voice, accelerometer, or image analysis. For example, selection of the personalized composite template 585, such as by user input, can activate the embedded function. In other examples, selection of the personalized composite template 585 can trigger a confirmation of activation. In other examples, a text response by the second user (e.g., within several responsive messages or within a time period following display of the personalized composite template 585 in the communication stream) can be analyzed as an affirmative or negative response, such as contextual analysis of the text response subsequent to display of the personalized composite template 585, optionally requesting direct yes/no confirmation before activation.

An embedded function mode can be triggered by receipt of an affirmative response, selection, or invocation of the embedded control by the second user. In other examples, an affirmative response can include a return invocation of the same or similar personalized composite template by the second user. In other examples, the second user can interact with the personalized composite template 585. In other examples, display of the personalized composite template 585 in the communication stream can pre-activate the embedded function for interaction with or by the second user.

Figure 5G:
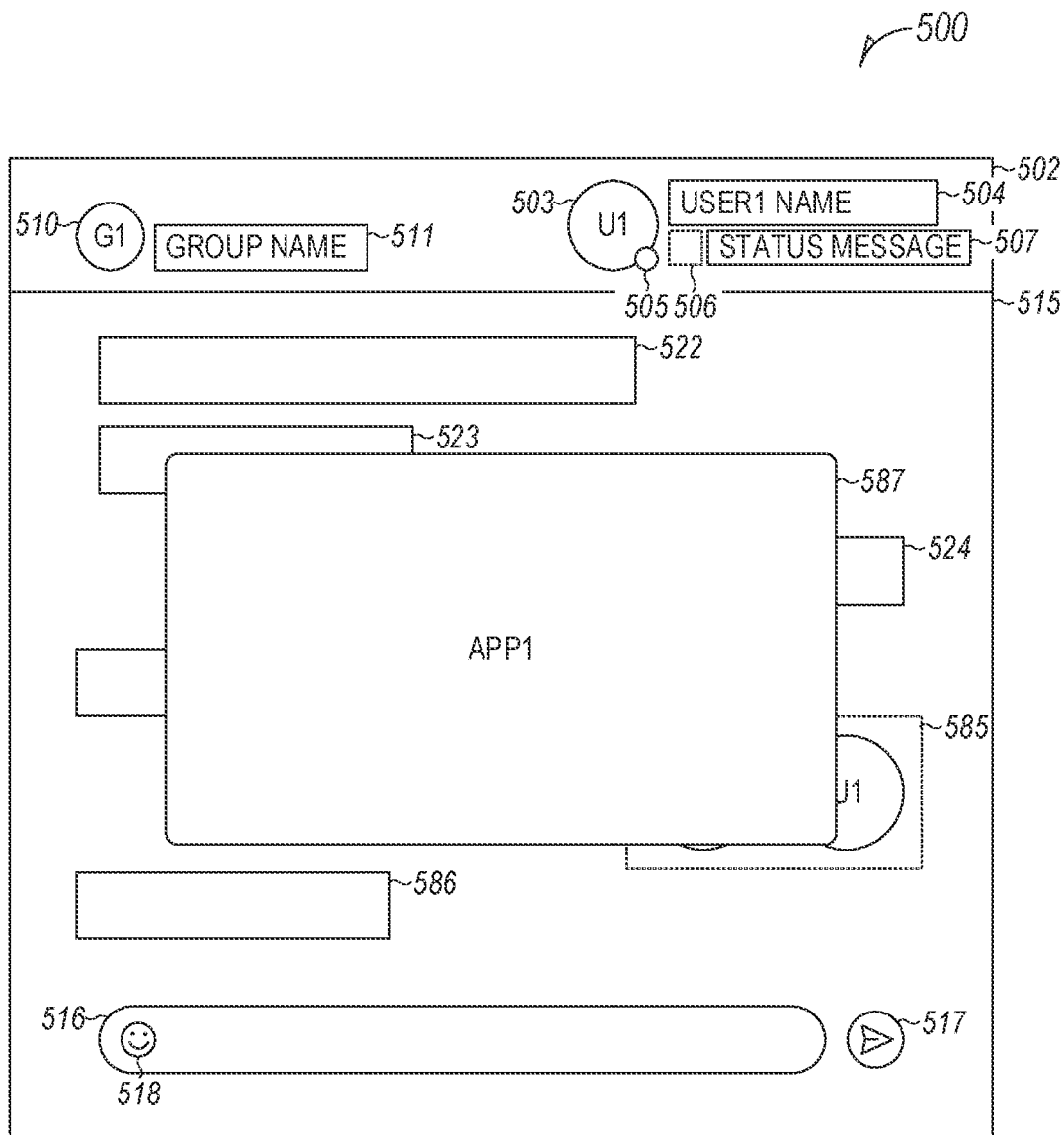

An embedded function can be activated, such as a first application (APP1) 587 associated with the personalized composite template 585 and illustrated in FIG. 5G. In this example, the embedded function comprises an application, such as a scheduling application to schedule an activity between the first and second users indicated by the personalized composite template 585, a voice or video communication application to establish a voice or video communication session between the first user and the second user, a collaborative work application to send, receive, or collaboratively view or edit a file or document with the first and second users, or one or more other applications. In other examples, the embedded function can include an interactive game between the first and second users, an event between the first and second users, such as lunch, dinner, or another digital- or real-world activity, etc.

In certain examples, the personalized composite template 585 can be generated and stored prior to generating the selectable template menu 530 at FIGS. 5A-5E, and the set of selectable templates can include the generated personalized composite templates. In other examples, individual components of the personalized composite templates, including the set of selectable templates, the representation of the first user 547, the representation of the second user 548, and text descriptions associated with the set of selectable templates can be stored, and the personalized composite templates can be created after selection of the selectable template.

Command-based generation of the selectable templates can save storage space and processing power, as the full number of personalized composite templates can be vast, whereas individual pieces of the personalized composite templates are typically already stored at various locations of the system. Moreover, generation after selection allows the system to provide robust and simple user-specific custom personalization without prior setup, using information typically found in user profiles. In certain examples, instead of distracting the user with a number of composite templates, relatively simple templates can be provided to the first user in the selectable template menu 530 and the personalized composite template 585 can be generated after selection. In other examples, respective personalized composite templates can be generated and provided to the user in the selectable template menu 530. Frequently selected personalized composite templates can be stored for efficient use/recall. However, seldom used or newly added templates can be generated into personalized composite templates only as necessary, reducing initialization time and storage requirements, providing a technical solution to the growing technical problem of expanding cost of user customizations.

Figure 6:
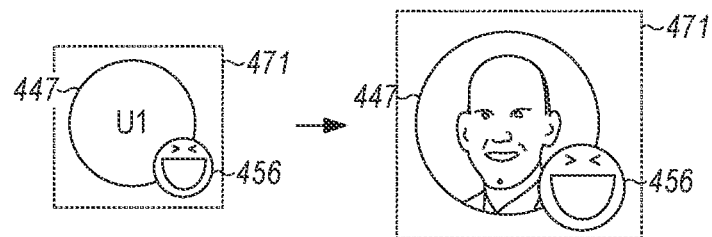
FIGS. 6-7 illustrate example personalized composite icons and templates.
Figure 7:
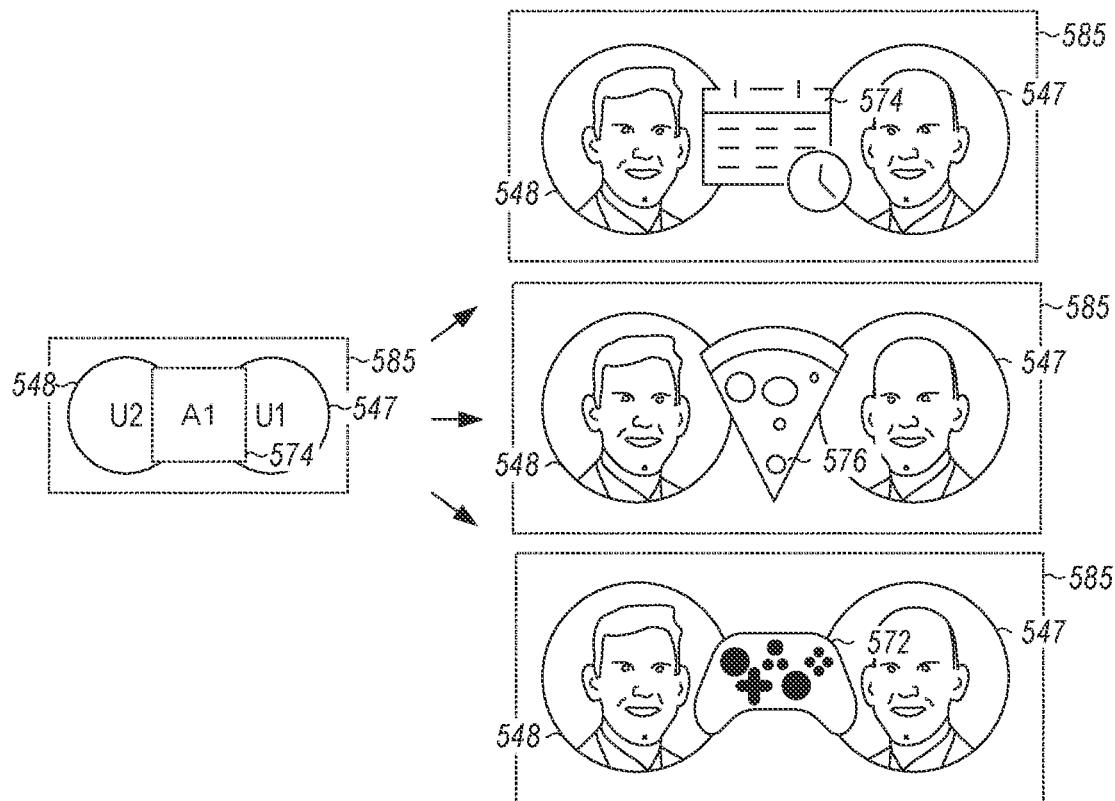

FIGS. 6-7 illustrate example personalized composite icons and templates, such as a personalized composite icon 471 illustrated in FIG. 4E or a personalized composite template 585 illustrated in FIG. 5F, including a combination of one or more selected icons or templates with a representation of the first user or the first and second users, such as for presentation to the first user for selection or for display in a communication stream.

The personalized composite icon 471 includes a representation of a first user 447 combined with a selectable icon, such as a laughing emoji 456 or one or more other selectable icons for display in a communication stream. The personalized composite template 585 includes a representation of first and second users 547, 548 and one or more of a selectable template, such as a first application template 574 (e.g., scheduling application, such as a shared calendar application, etc.), an event template 576 (e.g., meeting for food, such as pizza, etc., planning a vacation, or other in-person or online meeting, etc.), a game template 572 (e.g., joining an online game, etc.), or one or more other application, event, game, or combination thereof.

In certain examples, to create the personalized composite icons or templates, a selected icon or template can at least partially overlap one or both of a first or second user to create the look and feel of a personalized composite icon from a number of separate objects (e.g., emojis and avatars, etc.). In other examples, the size of the objects can be adjusted, as well as one or more other features, such as the opacity, color, or one or more other aspects, to enhance the look and feel of the composite icons.

In certain examples, the first user can have multiple profile pictures defined for different channels, sub-groups, groups, or even individual users, such that a single command-based input can provide different composite icons to different users or in different communication threads. In certain examples, in communication streams having more than two users (e.g., three or more, including the first user), a single command-based entry by the first user, such as described herein, can provide different composite icons or templates to be displayed in the communication stream for each of the different users. For example, the first user can have separate personal and work avatars, and the personalized composite icons or templates can include different avatars depending on whether the second user is a personal or work contact. In a single thread having personal and work users, the system can provide respective personalized icons or templates to respective intended users.

Figure 8:
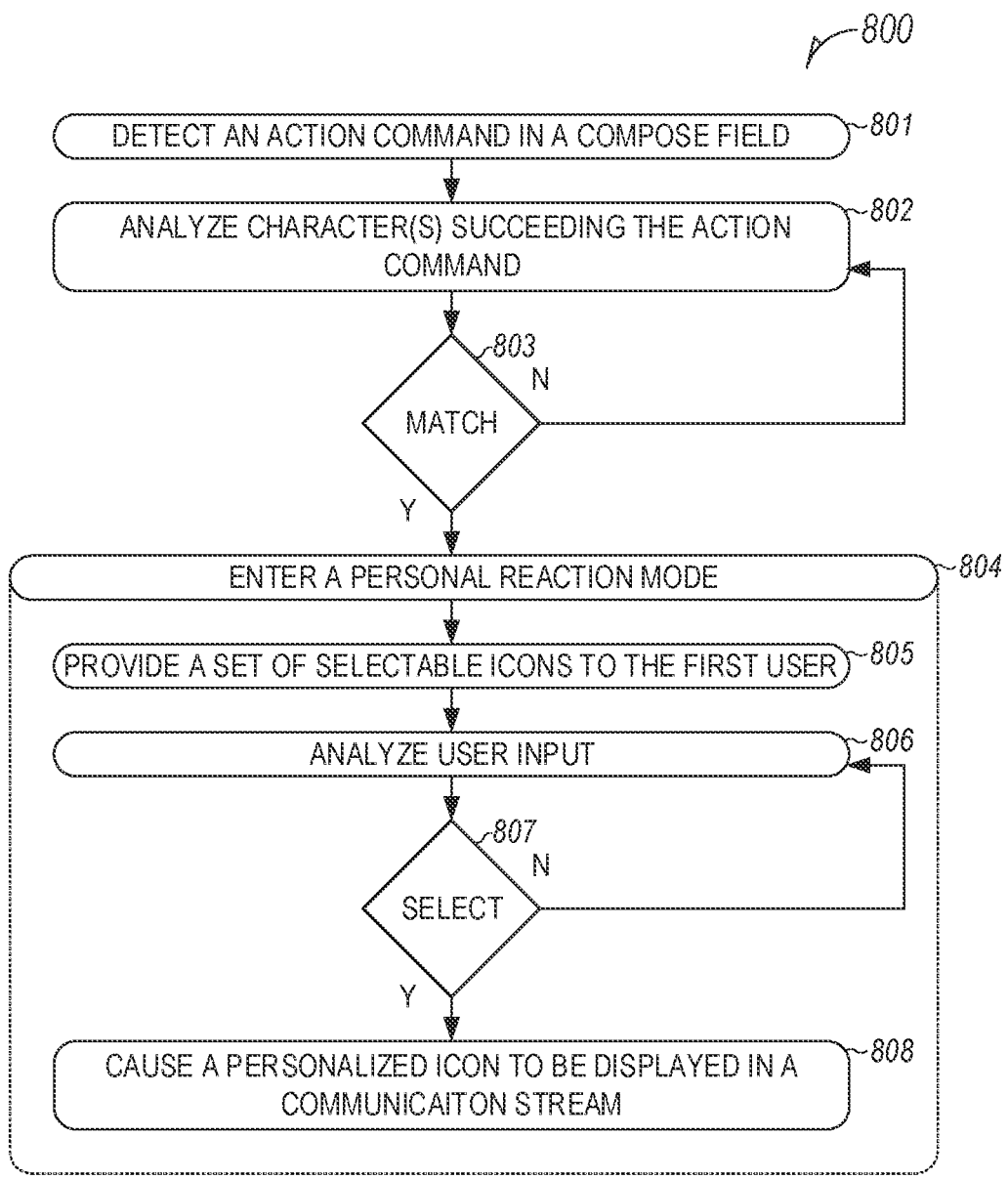
FIG. 8 illustrates an example method for providing command-based personalized composite icons in a communication stream.

FIG. 8 illustrates an example method 800 for providing command-based personalized composite icons in a communication stream. In various examples, one or more of the method steps discussed herein can be implemented by a communication platform, an application on a client device, a server-side application accessible by the client device through a network, or combinations thereof.

At 801, an action command can be detected in a compose field of a communication platform of a first user. The action command can include a first symbol, such as at least one of an at symbol ("@"), an open bracket symbol ("["), an open parentheses ("("), or a colon symbol ("."), or combinations of multiple symbols, including two of the same symbols (e.g., "@@", "::", etc.). The action command can indicate a function to be performed by the system, such as activation of one or more modes, etc.

At 802, characters succeeding the action command in the compose field of the communication platform can be analyzed. In an example, responsive to detecting the action command in the compose field, entries can be parsed from the compose field subsequent to the action command to identify one or more characters succeeding the action command. In an example, succeeding the action command can include immediately succeeding the action command, such as sequential characters entered in the compose field by a first user, in certain examples, without intervening characters.

If, at 803, the identified one or more characters do not match a first one or more characters of a name of the user (e.g., a username, a first name, a last name, an email address, or one or more other names of the first user) in the communication stream, analysis of the characters in the compose field can continue at 802. If, at 803, the identified one or more characters match the first one or more characters of the username of the first user, then a personal reaction mode can be entered at 804, allowing for selection of a personalized composite icon to be displayed in the communication stream.

At 805, a set of selectable icons can be provided to the first user based upon one or more rules in the personal reaction mode. The selectable icons can indicate a desired reaction of the first user. The personal reaction mode can include one or more rules defining priority or determination of the set of selectable icons. In certain examples, a respective selectable personalized composite icon can be composed for each of the set of selectable icons as a combination of a representation of the first user and the respective selectable icon as a set of selectable personalized composite icons in a look-up box proximate the compose field.

At 806, responsive to providing the set of selectable icons at 805, user input can be received and analyzed, such as to aid in selection of one of the set of selectable icons, filtering, reordering, etc. In certain examples, the user input can include one or more selection characters, transition characters, undo characters, one or more additional characters in the compose field, etc.

If, at 807, the analyzed user input is not indicative of a user selection of one of the set of selectable icons, analysis of user input can continue at 806. If, at 807, the analyzed user input is indicative of a user selection of one of the set of selectable icons, a personalized composite icon comprising a representation of the first user combined with the selected icon to be displayed in the communication stream at 808. In certain examples, the personalized composite icon can be composed prior to selection of the selectable icon by the user. In other examples, the personalized composite icon can be composed after selection of the selectable icon by the user.

In certain examples, the set of selectable icons can include a first number of a greater plurality of icons. Each of the greater plurality of icons can include a score. The one or more rules in the personal reaction mode can include a sorted list rule defining priority and determination of the set of selectable icons according to the received one or more additional characters. Adjusting the set of selectable icons according to the received one or more additional characters can include adjusting the set of selectable icons according to the sorted list rule, first reducing the greater plurality of icons according to the received one or more additional characters matching a first one or more characters of a description of the respective greater plurality of icons, and then based upon respective scores for each of the respective greater plurality of icons.

In other examples, the one or more rules in the personal reaction mode can define adjustment or determination of scores of at least one of the greater plurality of icons. For example, providing the set of selectable icons to the first user can include determining a priority for each of the greater plurality of icons of the first user based upon respective scores of the each of the icons. The set of selectable icons for the first user can be determined based on the determined priorities.

The one or more rules in the personal reaction mode can further include at least one of: a default rule of basic icons defining a first default score for a first subset of basic icons higher than default scores for the remaining greater plurality of icons; a user profile rule defining a second default score for a second subset of icons selected by the first user higher than the first default score, wherein individual icons of the second subset are the same or different than individual icons of the first subset; a first user reaction history rule defining a selection history of selected icons of the first user, wherein the score of respective icons of the plurality of icons increases with each selection of the respective icons; or a semantic analysis rule defining a semantic score for specific icons associated with words or icons of the first user or other users in the communication stream. Data for the scores and calculation of such can be determined and stored, such as by the communication platform, an application on the client device, a server-side application accessible by the client device through a network, or combinations thereof.

Figure 9:
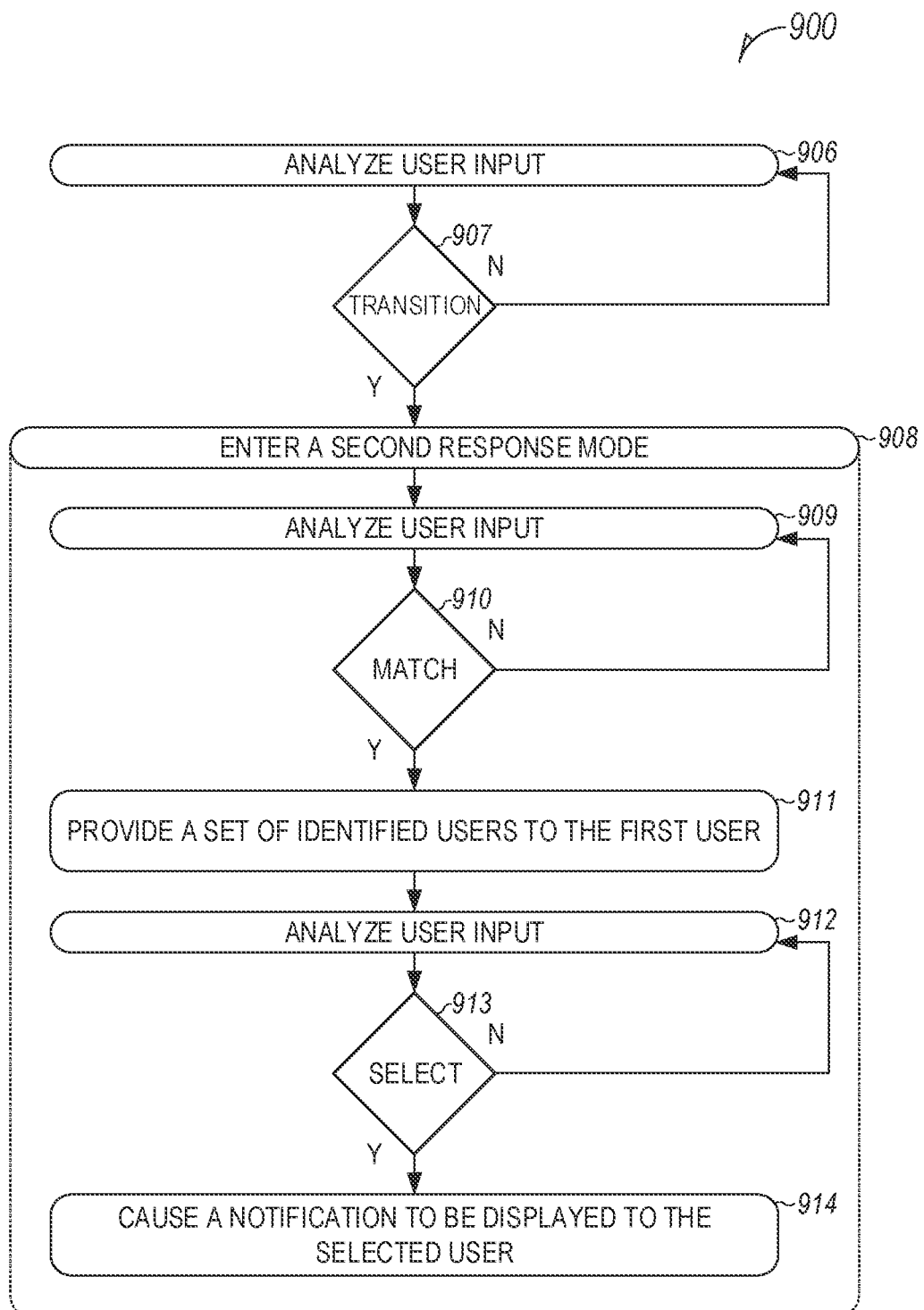
FIG. 9 illustrates an example method for causing a notification to be displayed to a selected user in a communication stream.

FIG. 9 illustrates an example method 900 for causing a notification to be displayed to a selected user in a communication stream. In various examples, one or more of the method steps discussed herein can be implemented by a communication platform, an application on a client device, a server-side application accessible by the client device through a network, or combinations thereof.

At 906, responsive to providing the set of selectable icons to the first user, one or more additional characters can be received from the compose field and analyzed to determine if the received one or more additional characters comprise a transition character comprising one of a backspace, left arrow, space, escape, or delete symbol. If, at 907, the received one or more additional characters does not include a transition character, analysis of the user input can continue at 906. If, at 907, the received one or more additional characters includes a transition character, the personal reaction mode can transition to a second response mode at 908. In certain examples, transition of modes can change how user input is analyzed, the rules used to sort or provide selectable menus to the first user, etc. Transition of modes can change device operation.

At 909, the identified one or more characters from the compose field can be analyzed to determine if the identified one or more characters match a first one or more characters of a username of one or more users different from the first user. If, at 910, the identified one or more characters do not match the first one or more characters of the username of the one or more users, analysis of the user input can continue at 909. If, at 910, the identified one or more characters match the first one or more characters of the username of the one or more users, a set of identified users can be provided to the first user at 911.

At 912, responsive to providing the set of the identified one or more users to the first user, user input can be received and analyzed. If, at 913, the user input does not indicate a selection, analysis of the user input can continue at 908. If, at 913, the user input does indicate that the first user has made a selection, such as by receiving one or more selection characters, etc., then a notification can be displayed to the selected user at 914.

Figure 10:
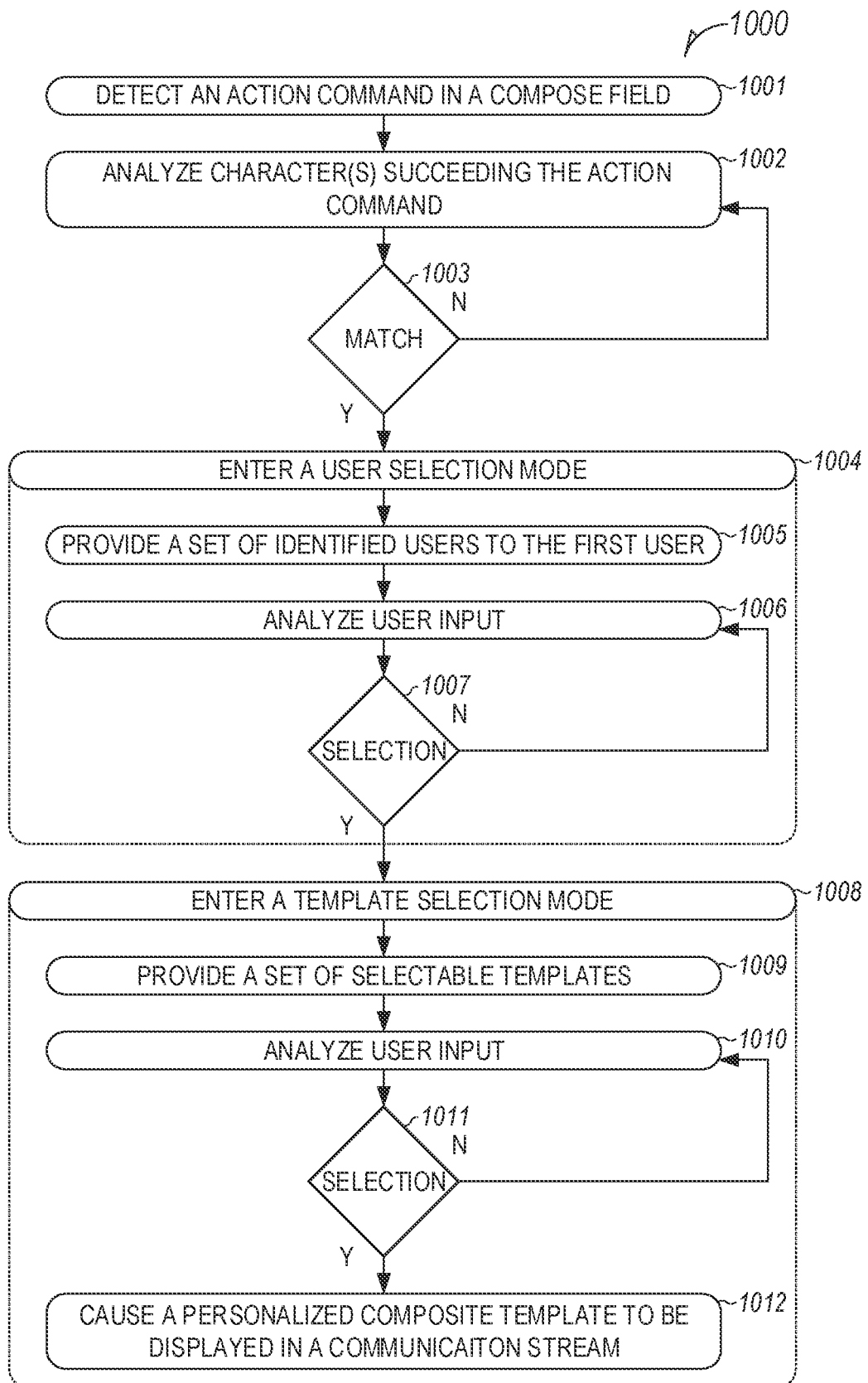
FIG. 10 illustrates an example method for providing command-based personalized composite templates in a communication stream.

FIG. 10 illustrates an example method 1000 for providing command-based personalized composite templates in a communication stream. In various examples, one or more of the method steps discussed herein can be implemented by a communication platform, an application on a client device, a server-side application accessible by the client device through a network, or combinations thereof.

At 1001, an action command can be detected in a compose field of a communication platform of a first user. The action command can include a first symbol, such as at least one of an at symbol ("@"), an open bracket symbol ("["), an open parentheses ("("), or a colon symbol (":"), or combinations of multiple symbols, including two of the same symbols (e.g., "@@", "::", etc.). The action command can indicate a function to be performed by the system, such as activation of one or more modes, etc.

At 1002, one or more characters succeeding the action command in the compose field of the communication platform can be analyzed. In an example, responsive to detecting the action command in the compose field, entries can be parsed from the compose field subsequent to the action command to identify one or more characters succeeding the action command. In an example, succeeding the action command can include immediately succeeding the action command, such as sequential characters entered in the compose field by a first user, in certain examples, without intervening characters.

If, at 1003, the identified one or more characters from the compose field do not match a first one or more characters of a username of the first user in the communication stream, analysis of the one or more characters in the compose field can continue at 1002. If, at 1003, the identified one or more characters from the compose field match the first one or more characters of the username of the first user in the communication stream, then the one or more users having usernames having the first one or more characters matching the identified one or more characters can be identified and a user selection mode can be entered at 1004, allowing for selection of a user to provide a personalized composite template in the communication stream.

At 1005, a set of the identified one or more users to the first user can be provided to the first user, such as based upon one or more rules in the user selection mode, the one or more rules defining priority or selection of the set of the identified one or more users.

At 1006, responsive to providing the set of the identified one or more users to the first user, user input can be received and analyzed, such as to aid in selection of one of the set of the identified one or more users as a second user.

If, at 1007, the analyzed user input is not indicative of a user selection of one of the set of users, analysis of user input can continue at 1006. If, at 1007, the analyzed user input is indicative of a user selection of one of the set of users, a template selection mode can be entered at 1008, allowing for selection of a personalized composite template to be displayed in the communication stream.

At 1009, a set of selectable templates can be provided to the first user, such as based upon one or more rules in the template selection mode. The selectable templates can indicate a desired reaction or activity corresponding to the first and second users. The one or more rules can define priority or determination of the set of selectable templates.

At 1010, responsive to providing the set of selectable templates, user input can be received, such as from the first user. If, at 1011, the analyzed user input is not indicative of a selection of one of the set of selectable templates, analysis of user input can continue at 1010. If, at 1011, the analyzed user input is indicative of the selection of one of the set of selectable templates as a selected template of the first user, a personalized composite template comprising representations of the first and second users combined with a representation of the selected template can be displayed in the communication stream at 1012.

In an example, one or more rules in the template selection mode define adjustment or determination of scores of at least one of the greater plurality of templates, the one or more rules in the user selection mode comprising: a sorted list rule defining priority and determination of the set of selectable templates from a greater plurality of templates according to the received one or more additional characters; and a first user templates history rule defining a selection history of selected templates of the first user, wherein the score of respective templates of the plurality of templates increases with each selection of the respective template. In certain examples, providing the set of the identified one or more users to the first user can include adjusting the set of selectable templates according to the received one or more additional characters according to the sorted list rule, first reducing the greater plurality of templates according to the received one or more additional characters matching one or more characters of a description of the respective greater plurality of templates, and then based upon respective scores for each of the respective greater plurality of templates. Receiving the selected one of the set of the identified one or more users as the second user can include receiving additional characters to complete the username of one of the set of the identified one or more users.

In an example, the set of selectable templates can include a first number of a greater plurality of templates, wherein each of the greater plurality of templates comprises a score. The one or more rules in the template selection mode can define adjustment or determination of scores of at least one of the greater plurality of templates. In an example, providing the set of selectable templates to the first user can include determining a priority for each of the greater plurality of templates of the first or second user based upon respective scores of the each of the templates and determining the set of selectable templates to the first user based on the determined priorities. In certain examples, the one or more rules in the template selection mode can include at least one of: a default rule of basic templates defining a first default score for a first subset of basic templates higher than default scores for the remaining greater plurality of templates; a user profile rule defining a second default score for a second subset of templates selected by the first user higher than the first default score, wherein individual templates of the second subset are the same or different than individual templates of the first subset; a first user templates history rule defining a selection history of selected templates of the first user, wherein the score of respective templates of the plurality of templates increases with each selection of the respective template; or a semantic analysis rule defining a semantic score for specific templates associated with words or templates of the first user or other users in the communication stream. In other examples, one or more other rules can be implemented.

Figure 11:
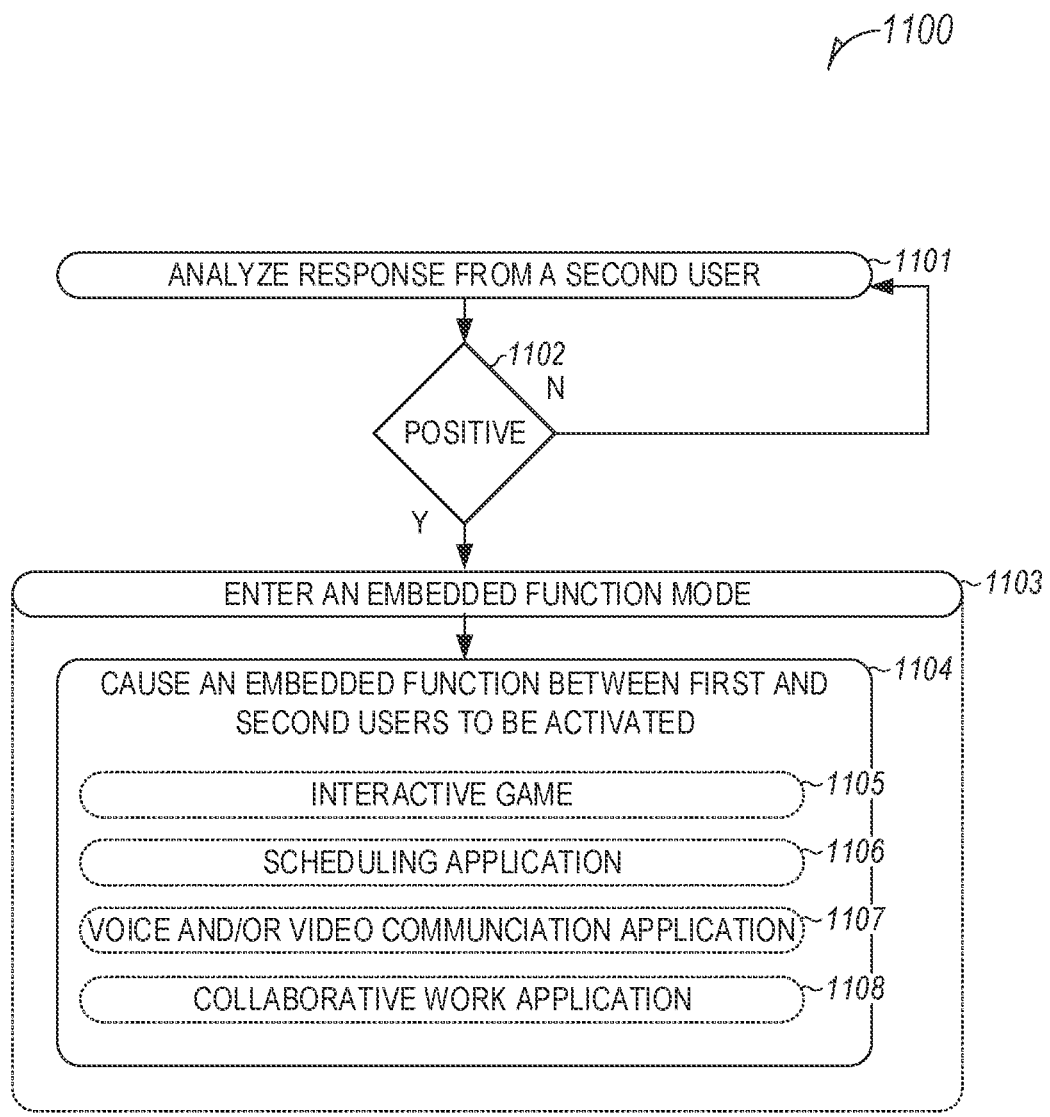
FIG. 11 illustrates an example method for causing an embedded function between first and second users to be activated in response to the provided command-based personalized composite template.

FIG. 11 illustrates an example method 1100 for providing command-based personalized composite templates in a communication stream and causing an embedded function between first and second users to be activated in response to the provided command-based personalized composite template. In various examples, one or more of the method steps discussed herein can be implemented by a communication platform, an application on a client device, a server-side application accessible by the client device through a network, or combinations thereof.

At 1101, responsive to causing a personalized composite template to be displayed in the communication stream, a response from a second user can be received and analyzed. In certain examples, the personalized composite template can include an embedded control, selectable or invocable by the second user. The embedded control can be associated with the desired reaction or activity indicated by the selected template.

If, at 1102, the response is not positive, analysis can continue at 1101. If, at 1102, the response is positive, an embedded function mode can be entered at 1103. At 1104, an embedded function between the first and second users can be activated. In an example, activating an embedded function between the first and second users can include one or more of activating an interactive game between the first and second users at 1105, activating a scheduling application at 1106, for example, to schedule an activity indicated by the selected template between the first and second users, a voice and/or video communication application 1107 ("to establish a voice or video communication session between the first user and the second user different from the displayed personalized composite template between the first and second users"), a collaborative work application at 1108 to send, receive, or collaboratively view or edit a file or document, etc.

Figure 12:
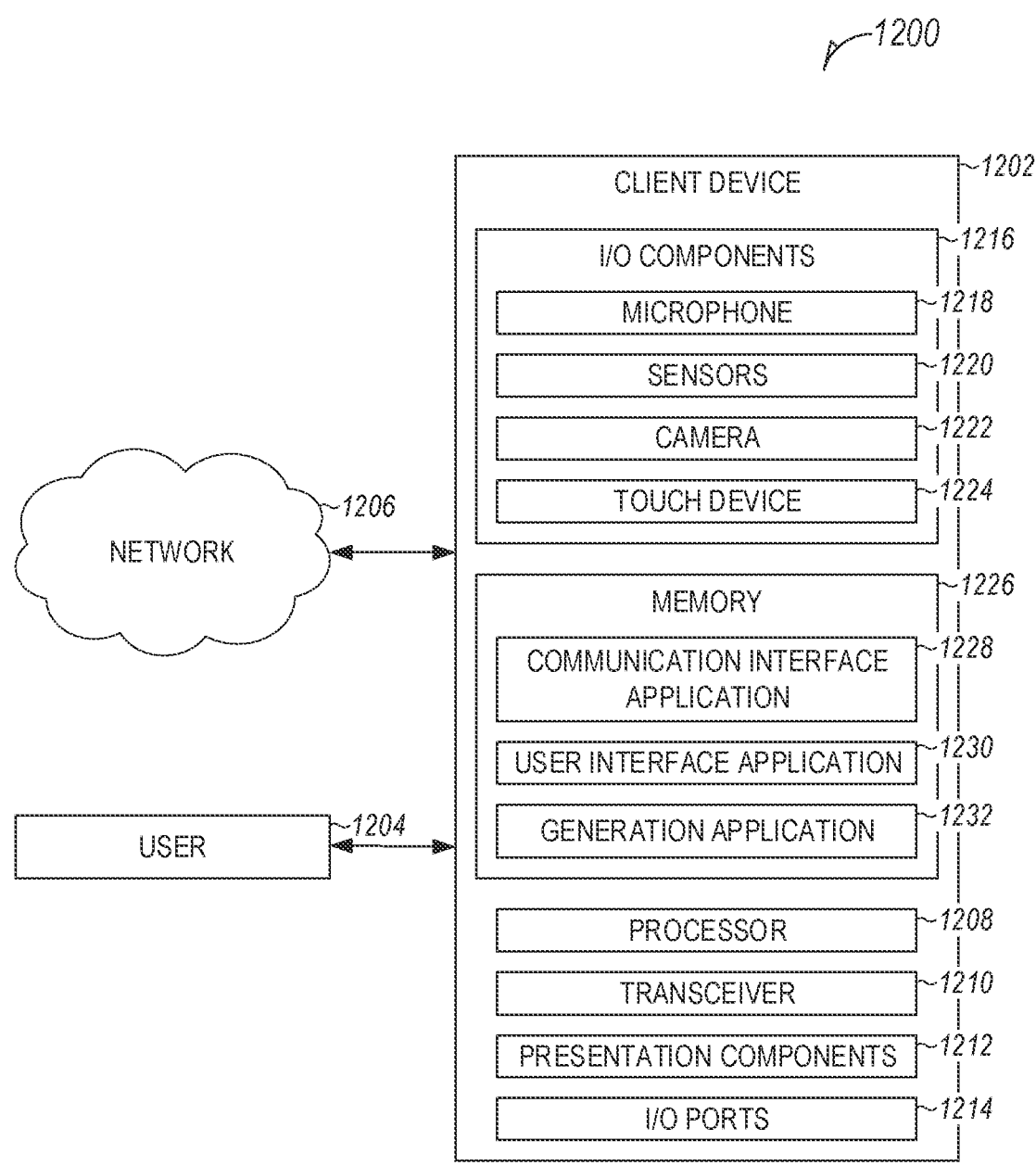
FIG. 12 illustrates an example system including a client device.

FIG. 12 illustrates an example system 1200 including a client device 1202 (e.g., a computing device) having at least one processor 1208, a transceiver 1210, one or more presentation components 1212, one or more input/output (I/O) ports 1214, and a memory 1226. The client device 1202 can take the form of a mobile computing device or any other portable device, such as a mobile telephone, laptop, tablet, computing pad, notebook, gaming device, portable media player, etc. In other examples, the client device 1202 can include a less portable device, such as desktop personal computer, kiosk, tabletop device, industrial control device, etc. Other examples can incorporate the client device 1202 as part of a multi-device system in which two separate physical devices share or otherwise provide access to the illustrated components of the client device 1202.

The processor 1208 can include any quantity of processing units and is programmed to execute computer-executable instructions for implementing aspects of the disclosure. The instructions may be performed by the processor or by multiple processors within the computing device or performed by a processor external to the client device 1202. In some examples, the processor 1208 is programmed to execute methods, such as the one or more method illustrated herein at FIGS. 8-11, etc. Additionally, or alternatively, the processor 1208 can be programmed to present an experience in a user interface ("UI"), such as the user interfaces illustrated in FIGS. 2-5G, etc. In certain examples, the processor 1208 can represent an implementation of techniques to perform the operations described herein.

The transceiver 1210 can include an antenna capable of transmitting and receiving radio frequency ("RF") signals and various antenna and corresponding chipsets to provide communicative capabilities between the client device 1202 and one or more other remote devices. Examples are not limited to RF signaling, however, as various other communication modalities may alternatively be used.

The presentation components 1212 can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user 1204 or provide information visibly or audibly on the client device 1202. For example, the client device 1202 can include a smart phone or a mobile tablet including speakers capable of playing audible search results to the user 1204. In other examples, the client device 1202 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio presentation components 1212.

I/O ports 1214 allow the client device 1202 to be logically coupled to other devices and I/O components 1216, some of which may be built into client device 1202 while others may be external.

I/O components 1216 can include a microphone 1218, one or more sensors 1220, a camera 1222, and a touch device 1224. The microphone 1218 can capture speech from the user 1204 and/or speech of or by the user 1204. The sensors 1220 can include any number of sensors on or in a mobile computing device, electronic toy, gaming console, wearable device, television, vehicle, or other client device 1202, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 1204 or the environment. The camera 1222 can capture images or video of or by the user 1204. The touch device 1224 can include a touchpad, track pad, touch screen, or other touch-capturing device. In other examples, the I/O components 1216 can include one or more of a sound card, a vibrating device, a scanner, a printer, a wireless communication module, or any other component for capturing information related to the user 1204 or the environment.

The memory 1226 can include any quantity of memory associated with or accessible by the client device 1202. The memory 1226 can be internal to the client device 1202, external to the client device 1202, or a combination thereof. The memory 1226 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 1202. The terms computer-readable medium, machine readable medium, and storage device do not include carrier waves to the extent carrier waves are deemed too transitory. The memory 1226 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 1226 can be distributed across multiple client devices 1202, such as in a virtualized environment in which instruction processing is carried out on multiple ones of the client device 1202. The memory 1226 can store, among other data, various device applications that, when executed by the processor 1208, operate to perform functionality on the client device 1202. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 1206. For example, the applications can include client-operating applications that correspond to server-side applications executing on remote servers or computing devices in the cloud.

Instructions stored in the memory 1226 can include, among other things, one or more of a communication interface application 1228, a user interface application 1230, and a generation application 1232. The communication interface application 1228 can include one or more of computer-executable instructions for operating a network interface card and a driver for operating the network interface card. Communication between the client device 1202 and other devices can occur using any protocol or mechanism over a wired or wireless connection or across the network 1206. In some examples, the communication interface application 1228 is operable with RF and short-range communication technologies using electronic tags, such as NFC tags, Bluetooth® brand tags, etc.

In some examples, the user interface application 1230 includes a graphics application for displaying data to the user and receiving data from the user. The user interface application 1230 can include computer-executable instructions for operating the graphics card to display search results and corresponding images or speech on or through the presentation components 1212. The user interface application 1230 can interact with the various sensors 1220 and camera 1222 to both capture and present information through the presentation components 1212.

Figure 13:
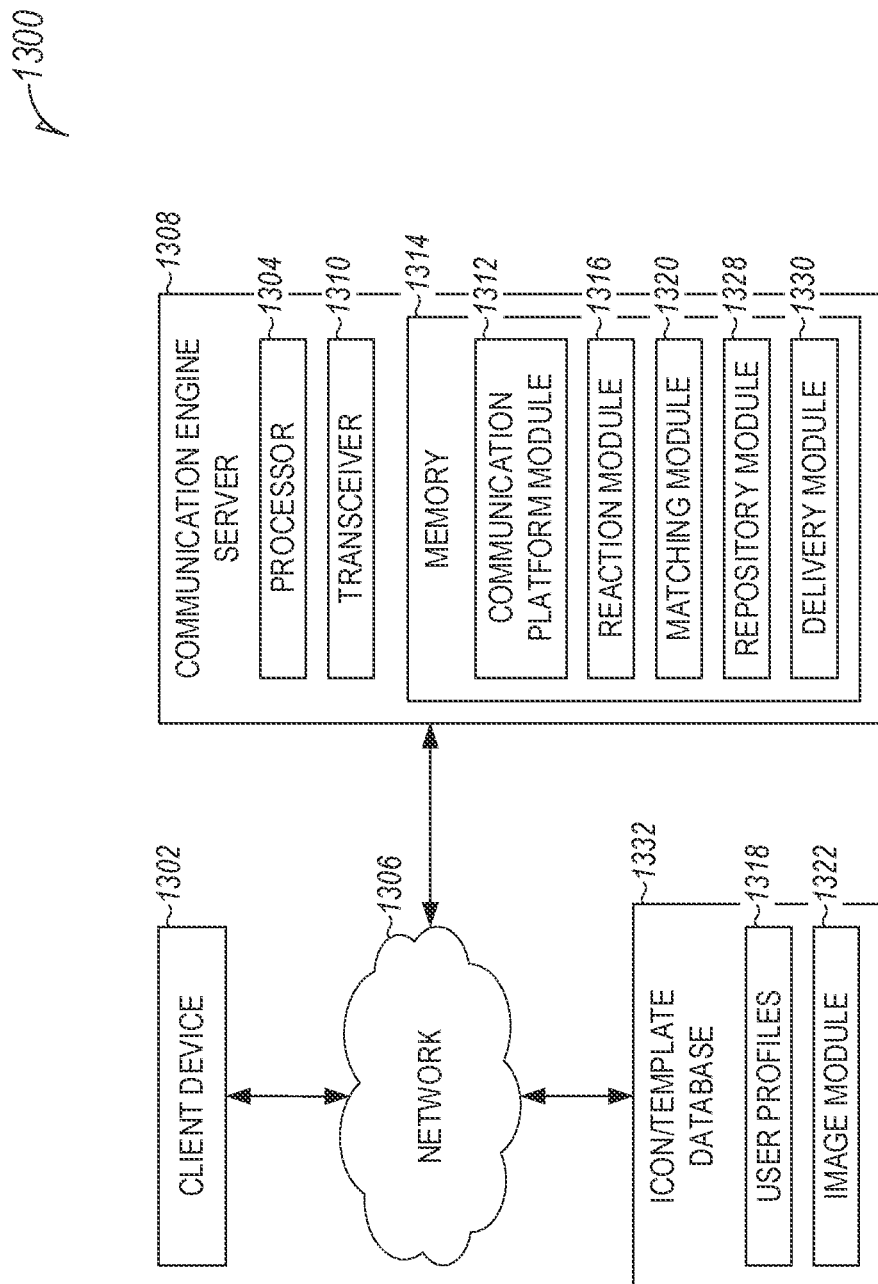
FIG. 13 illustrates an example networking environment including one or more client devices, a communication engine server, and an icon/template database communicating over a network.

FIG. 13 illustrates an example networking environment 1300 including one or more client devices 1302, a communication engine server 1308, and an icon/template database 1332 communicating over a network 1306. In some examples, user and environment data are communicated by the client devices 1302 over the network 1306 to the communication engine server 1308. In certain examples, the communication engine server 1308 can provide or facilitate generation of personalized composite icons or templates for users of the one or more client device 1302 and manage communication streams among different groups of users.

The networking environment 1300 illustrated in FIG. 13 is an example of one suitable computing system environment and is not intended to suggest any limitation as to the scope of use or functionality of examples disclosed herein. The illustrated networking environment 1300 should not be interpreted as having any dependency or requirement related to any single component, module, index, or combination thereof, and in other examples, other network environments are contemplated.

The network 1306 can include the internet, a private network, a local area network (LAN), a wide area network (WAN), or any other computer network, including various network interfaces, adapters, modems, and other networking devices for communicatively connecting the client devices 1302 and the communication engine server 1308. The network 1306 can also include configurations for point-to-point connections.

The client device 1302 include any type of client device discussed herein. Each client device 1302 can capture user or environment data from their respective users and communicate the captured user and environment data over the network 1306 to the communication engine server 1308, such as using a communications interface application as discussed herein. In response, the communication engine server 1308 can be capable of providing and receiving messages including images, videos, audio, text, and other various communication media to and from client device 1302 over the network 1306.

The client device 1302 can include various software applications and presentation components for communicating via a communication platform module 1312 for combining subsequent data in a communication stream. For example, a mobile phone can display a communication platform (e.g., Microsoft Teams application) for communicating with friends or other users in a group. The communication platform can include a feature that provides command-based generation, selection, and display of personalized composite icons or templates in a communication stream. Any number of different variations of client devices 1302 and presentation techniques can be used to procure and integrate devices.

The communication engine server 1308 represents a server or collection of servers configured to execute different web-service computer-executable instructions. The communication engine server 1308 includes a processor 1304 to process executable instructions, a transceiver 1310 to communicate over the network 1306, and a memory 1314 embodied with at least the following executable instructions: a communication platform module 1312, a reaction module 1316, a matching module 1320, or one or more other modules, such as a triggering module, an audio module, etc. The memory 1314 can include instructions for a repository module 1328 and a delivery module 1330. While the communication engine server 1308 is illustrated as a single box, it is not so limited, and can be scalable. For example, the communication engine server 1308 can include multiple servers operating various portions of software that collectively generate composite icons or templates for users of the one or more client devices 1302.

The icon/template database 1332 can provide backend storage of Web, user, and environment data that can be accessed over the network 1306 by the communication engine server 1308 or the client device 1302 and used by the communication engine server 1308 to combine subsequent data in a communication stream. The Web, user, and environment data stored in the database includes, for example but without limitation, one or more user profiles 1318 and an image module 1322. The image module 1322 can include historical logs of active, inactive, and pending devices along with faulty devices, devices out for repair, and other information related to devices within the network and/or organization associated with a user. Additionally, though not shown for the sake of clarity, the servers of the icon/template database 1332 can include their own processors, transceivers, and memory. Also, networking environment 1300 depicts the icon/template database 1332 as a collection of separate devices from the communication engine server 1308 however, examples can actually store the discussed Web, user, and environment data shown in the icon/template database 1332 on the communication engine server 1308.

Herein, a "user profile" refers to an electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile can be built through probing questions to the user or through analyzing the user's behavior on one or more client devices.

Additionally, user profiles 1318 can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 1318 can be expanded to encompass various other aspects of the user.

The present disclosure relates to systems and methods for providing a command-based personalized composite template in a communication stream according to at least the examples provided in the sections below:

(A1) In one aspect, some embodiments or examples include a system including one or more processors and a memory storing computer-executable instructions that, when executed, cause the one or more processors to control the system to perform the following operations that cause a personalized composite template comprising representations of first and second users combined with a representation of a selected template to be displayed in the communication stream. The operations include detecting an action command in a compose field of a communication platform of a first user, wherein the action command indicates a function to be performed by the system; responsive to detecting the action command in the compose field, parsing entries from the compose field subsequent to the action command to identify one or more characters succeeding the action command, and analyzing the identified one or more characters from the compose field to determine if the identified one or more characters match a first one or more characters of a username of one or more users different from the first user.

Responsive to determining that the identified one or more characters match the first one or more characters of the username of one or more users, the operations include identifying the one or more users having usernames having the first one or more characters matching the identified one or more characters and entering a user selection mode allowing for selection of one of the identified one or more users, comprising providing. based upon one or more rules in the user selection mode, a set of the identified one or more users to the first user, the one or more rules defining priority or selection of the set of the identified one or more users. Responsive to providing the set of the identified one or more users to the first user, the operations include receiving a selected one of the set of the identified one or more users as a second user.

Responsive to receiving the selected second user, the operations include entering a template selection mode allowing for selection of a personalized composite template to be displayed in the communication stream, the personalized composite template indicating a desired reaction or activity corresponding to the first and second users, comprising providing, based upon one or more rules in the template selection mode, a set of selectable templates to the first user, the selectable templates indicating the desired reaction or activity corresponding to the first and second users, the one or more rules defining priority or determination of the set of selectable templates. Responsive to providing the set of selectable templates, the operations include receiving a selected one of the set of selectable templates as a selected template from the first user and causing a personalized composite template comprising representations of the first and second users combined with a representation of the selected template to be displayed in the communication stream.

(A2) In some embodiments of A1, the personalized composite template comprises an embedded control, selectable or invocable by the second user, the embedded control associated with the desired reaction or activity indicated by the selected template. Further in some embodiments of A1, the operations comprise: responsive to causing the personalized composite template to be displayed in the communication stream, receiving an affirmative response from the second user including selection or invocation of the embedded control; and responsive to receiving the affirmative response, entering an embedded function mode by causing the system to activate the embedded function and allowing for interaction by one or both of the first and second users with the embedded function associated with the desired reaction or activity indicated by the selected template.

(A3) In some embodiments of A1-A2, receiving the affirmative response comprises receiving one or more of: a click, selection, or tap on the personalized composite template, an affirmative voice or gesture input, a return selection of the same or similar personalized composite template of the second user in the communication stream, or an affirmative text response.

(A4) In some embodiments of A1-A3, the embedded function comprises one or more of: an interactive game between the first and second users; a scheduling application to schedule an activity indicated by the selected template between the first and second users; a voice or video communication application to establish a voice or video communication session between the first user and the second user different from the displayed personalized composite template between the first and second users; or a collaborative work application to send, receive, or collaboratively view or edit a file or document.

(A5) In some embodiments of A1-A4, providing the set of selectable templates to the first user comprises: composing, for each of the set of selectable templates, a respective selectable personalized composite template as a combination of the representation of the first user, the representation of the second user, and the respective representation of the selected template in a look-up box proximate the compose field.

(A6) In some embodiments of A1-A5, the operations comprise: composing the personalized composite template as a combination of the representation of the first user, the representation of the second user, and the representation of the selected template.

(A5) In some embodiments of A1-A6, the operations comprise: responsive to providing the set of the identified one or more users to the first user, receiving one or more additional characters from the compose field, wherein the one or more rules in the template selection mode define adjustment or determination of scores of at least one of the greater plurality of templates, the one or more rules in the user selection mode comprising: a sorted list rule defining priority and determination of the set of selectable templates from a greater plurality of templates according to the received one or more additional characters; and a first user templates history rule defining a selection history of selected templates of the first user, wherein the score of respective templates of the plurality of templates increases with each selection of the respective template, wherein providing the set of the identified one or more users to the first user comprises adjusting the set of selectable templates according to the received one or more additional characters according to the sorted list rule, first reducing the greater plurality of templates according to the received one or more additional characters matching one or more characters of a description of the respective greater plurality of templates, and then based upon respective scores for each of the respective greater plurality of templates, and wherein receiving the selected one of the set of the identified one or more users as the second user comprises receiving additional characters to complete the username of one of the set of the identified one or more users.

(A8) In some embodiments of A1-A7, the operations comprise: responsive to receiving the selected second user and providing the set of selectable templates, receiving one or more additional characters beyond the username of the second user; analyzing the received one or more additional characters beyond the username of the second user to determine if the one or more additional characters beyond the username of the second user comprise one or more selection characters for the set of selectable templates; and responsive to determining that the one or more additional characters beyond the username of the first user comprise one or more selection characters for the set of selectable templates: updating the set of selectable templates according to the received one or more additional characters, comprising at least one of: adjusting the set of selectable templates according to the received one or more additional characters; and responsive to updating the set of selectable icons, providing an autocomplete suggestion of remaining characters of one of the updated set of selectable templates in the compose field beyond the received one or more additional characters, wherein selection characters for the set of selectable templates comprise one or more of an up arrow, down arrow, or right arrow symbol, or a tab, letter, enter, return, or number character.

(A9) In some embodiments of A1-A8, the set of selectable templates comprises a first number of a greater plurality of templates, wherein each of the greater plurality of templates comprises a score, wherein the one or more rules in the template selection mode comprises a sorted list rule defining priority and determination of the set of selectable templates according to the received one or more additional characters, and wherein adjusting the set of selectable templates according to the received one or more additional characters comprises according to the sorted list rule, first reducing the greater plurality of templates according to the received one or more additional characters matching a first one or more characters of a description of the respective greater plurality of templates, and then based upon respective scores for each of the respective greater plurality of templates.

(A10) In some embodiments of A1-A9, the set of selectable templates comprises a first number of a greater plurality of templates, wherein each of the greater plurality of templates comprises a score, and the one or more rules in the template selection mode define adjustment or determination of scores of at least one of the greater plurality of templates, and providing the set of selectable templates to the first user comprises: determining a priority for each of the greater plurality of templates of the first or second user based upon respective scores of the each of the templates; and determining the set of selectable templates to the first user based on the determined priorities.

(A11) In some embodiments of A1-A10, the one or more rules in the template selection mode comprises at least one of: a default rule of basic templates defining a first default score for a first subset of basic templates higher than default scores for the remaining greater plurality of templates; a user profile rule defining a second default score for a second subset of templates selected by the first user higher than the first default score, wherein individual templates of the second subset are the same or different than individual templates of the first subset; a first user templates history rule defining a selection history of selected templates of the first user, wherein the score of respective templates of the plurality of templates increases with each selection of the respective template; or a semantic analysis rule defining a semantic score for specific templates associated with words or templates of the first user or other users in the communication stream.

(A12) In some embodiments of A1-A11, the one or more characters comprises at least one of a symbol, a letter, or a number; the action command comprises a first symbol, wherein the first symbol comprises at least one of an "@", an open bracket, an open parentheses, or a colon symbol; succeeding the action command comprises immediately succeeding the action command; the set of selectable templates comprises a first number of a greater plurality of templates; the plurality of templates comprises at least one of reaction template or an activity template; the reaction template comprises at least one of a laugh template, a kiss template, a hug template, a high-five template, a handshake template, or a fist-bump template; the activity template comprises at least one of a lunch template, a dinner template, a coffee template, a movie template, a beer template, a call template, a game template, a file template, a run template, a bike template, a gym template, or a trip template; the representation of the first user comprises one of a profile picture or an avatar of the first user; the representation of the second user comprises one of a profile picture or an avatar of the second user; and the representation of the selected template comprises a picture representation of the selected template.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A system for providing a command-based personalized composite icon in a communication stream, comprising:
one or more processors; and
a memory storing computer-executable instructions that, when executed, cause the one or more processors to control the system to perform operations comprising:
detecting an action command in a compose field of a communication platform of a first user, wherein the action command indicates a function to be performed by the system,
responsive to detecting the action command in the compose field, parsing entries from the compose field subsequent to the action command to identify one or more characters succeeding the action command;
analyzing the identified one or more characters from the compose field to determine if the identified one or more characters match a first one or more characters of a username of the first user in the communication stream; and
responsive to determining that the identified one or more characters match the first one or more characters of the username of the first user, entering a personal reaction mode allowing for selection of a personalized composite icon to be displayed in the communication stream, comprising:
providing, based upon one or more rules in the personal reaction mode, a set of selectable icons to the first user, the selectable icons indicating a desired reaction of the first user, the one or more rules defining priority or determination of the set of selectable icons;
responsive to providing the set of selectable icons, receiving a selected one of the set of selectable icons as a selected icon from the first user; and
causing a personalized composite icon comprising a representation of the first user combined with the selected icon to be displayed in the communication stream.

2. The system of claim 1, wherein providing the set of selectable icons to the first user comprises:
composing, for each of the set of selectable icons, a respective selectable personalized composite icon as a combination of the representation of the first user and the respective selectable icons as a set of selectable personalized composite icons in a look-up box proximate the compose field.

3. The system of claim 1, wherein the operations comprise:
composing the personalized composite icon as a combination of the representation of the first user and the selected icon.

4. The system of claim 1, wherein providing the set of selectable icons to the first user comprises:
providing an autocomplete suggestion of remaining characters of the username of the first user beyond the identified one or more characters in the compose field;
responsive to providing the autocomplete suggestion, receiving one or more additional characters from the compose field;
analyzing the received one or more additional characters to determine if the one or more additional characters comprise one of an accept character for the autocomplete suggestion or the remaining characters of the username of the first user;
responsive to determining that the one or more additional characters comprise an accept character for the autocomplete suggestion or the remaining characters of the username of the first user, updating the characters in the compose field to include the complete username of the first user; and
responsive to updating the characters in the compose field to include the complete username of the first user, highlighting a default representation of the user in a look-up box proximate the compose field,
wherein the accept character for the autocomplete suggestion comprises a right arrow or a tab symbol.

5. The system of claim 4, wherein the operations comprise:
responsive to updating the characters in the compose field to include the complete username of the first user, receiving one or more additional characters beyond the username of the first user;
analyzing the received one or more additional characters beyond the username of the first user to determine if the one or more additional characters beyond the username of the first user comprise one or more selection characters for the set of selectable icons; and
responsive to determining that the one or more additional characters beyond the username of the first user comprise one or more selection characters for the set of selectable icons:
updating the set of selectable icons according to the received one or more additional characters, comprising at least one of:
adjusting the highlighting in the look-up box according to the received one or more additional characters;
adjusting the set of selectable icons according to the received one or more additional characters; and
responsive to updating the set of selectable icons, providing an autocomplete suggestion of remaining characters of the highlighted selectable icon in the compose field beyond the received one or more additional characters,
wherein selection characters for the set of selectable icons comprise one or more of an up arrow, down arrow, or right arrow symbol, or a tab, letter, return, enter, or number character.

6. The system of claim 5, wherein the set of selectable icons comprises a first number of a greater plurality of icons, wherein each of the greater plurality of icons comprises a score,
wherein the one or more rules in the personal reaction mode comprises a sorted list rule defining priority and determination of the set of selectable icons according to the received one or more additional characters, and
wherein adjusting the set of selectable icons according to the received one or more additional characters comprises according to the sorted list rule, first reducing the greater plurality of icons according to the received one or more additional characters matching a first one or more characters of a description of the respective greater plurality of icons, and then based upon respective scores for each of the respective greater plurality of icons.

7. The system of claim 1, wherein the set of selectable icons comprises a first number of a greater plurality of icons, wherein each of the greater plurality of icons comprises a score,
wherein the one or more rules in the personal reaction mode define adjustment or determination of scores of at least one of the greater plurality of icons, and
wherein providing the set of selectable icons to the first user comprises:
determining a priority for each of the greater plurality of icons of the first user based upon respective scores of the each of the icons; and
determining the set of selectable icons to the first user based on the determined priorities.

8. The system of claim 7, wherein the one or more rules in the personal reaction mode comprises at least one of:
a default rule of basic icons defining a first default score for a first subset of basic icons higher than default scores for the remaining greater plurality of icons;
a user profile rule defining a second default score for a second subset of icons selected by the first user higher than the first default score, wherein individual icons of the second subset are the same or different than individual icons of the first subset;
a first user reaction history rule defining a selection history of selected icons of the first user, wherein the score of respective icons of the plurality of icons increases with each selection of the respective icons; or
a semantic analysis rule defining a semantic score for specific icons associated with words or icons of the first user or other users in the communication stream.

9. The system of claim 1, wherein the operations comprise:
responsive to providing the set of selectable icons to the first user, receiving one or more additional characters from the compose field;
analyzing the received one or more additional characters to determine if the received one or more additional characters comprise a transition character comprising one of a backspace, left arrow, space, escape, or delete symbol; and
responsive to determining that the one or more additional characters comprises the transition character, transitioning from the personal reaction mode to a second response mode, comprising:
analyzing the identified one or more characters from the compose field to determine if the identified one or more characters match a first one or more characters of a username of one or more users different from the first user; and
responsive to determining that the identified one or more characters match the first one or more characters of the username of one or more users, identifying the one or more users having usernames having the first one or more characters matching the identified one or more characters:
providing a set of the identified one or more users to the first user;
responsive to providing the set of the identified one or more users to the first user, receiving a selected one of the set of the identified one or more users as a selected user; and
causing a notification to be displayed to the selected user.

10. The system of claim 1, wherein the one or more characters comprises at least one of a symbol, a letter, or a number,
wherein the action command comprises a first symbol, wherein the first symbol comprises at least one of an "@", an open bracket, an open parentheses, or a colon symbol,
wherein succeeding the action command comprises immediately succeeding the action command,
wherein the set of icons comprises a set of images, emojis, or text emotions, and
wherein the representation of the first user comprises one of a profile picture or an avatar of the first user.

11. A method for providing a command-based personalized composite icon in a communication stream, comprising:
detecting an action command in a compose field of a communication platform of a first user, wherein the action command indicates a function to be performed by a system,
responsive to detecting the action command in the compose field, parsing entries from the compose field subsequent to the action command to identify one or more characters succeeding the action command;
analyzing the identified one or more characters from the compose field to determine if the identified one or more characters match a first one or more characters of a username of the first user in the communication stream; and
responsive to determining that the identified one or more characters match the first one or more characters of the username of the first user, entering a personal reaction mode allowing for selection of a personalized composite icon to be displayed in the communication stream, comprising:
providing, based upon one or more rules in the personal reaction mode, a set of selectable icons to the first user, the selectable icons indicating a desired reaction of the first user, the one or more rules defining priority or determination of the set of selectable icons;
responsive to providing the set of selectable icons, receiving a selected one of the set of selectable icons as a selected icon from the first user; and
causing a personalized composite icon comprising a representation of the first user combined with the selected icon to be displayed in the communication stream.

12. The method of claim 11, wherein providing the set of selectable icons to the first user comprises:
composing, for each of the set of selectable icons, a respective selectable personalized composite icon as a combination of the representation of the first user and the respective selectable icons as a set of selectable personalized composite icons in a look-up box proximate the compose field.

13. The method of claim 11, comprising:
composing the personalized composite icon as a combination of the representation of the first user and the selected icon.

14. The method of claim 11, wherein providing the set of selectable icons to the first user comprises:
providing an autocomplete suggestion of remaining characters of the username of the first user beyond the identified one or more characters in the compose field;

responsive to providing the autocomplete suggestion, receiving one or more additional characters from the compose field;

analyzing the received one or more additional characters to determine if the one or more additional characters comprise one of an accept character for the autocomplete suggestion or the remaining characters of the username of the first user;

responsive to determining that the one or more additional characters comprise an accept character for the autocomplete suggestion or the remaining characters of the username of the first user, updating the characters in the compose field to include the complete username of the first user; and responsive to updating the characters in the compose field to include the complete username of the first user, highlighting a default representation of the user in a look-up box proximate the compose field, wherein the accept character for the autocomplete suggestion comprises a right arrow or a tab symbol.

15. The method of claim 14, comprising:

responsive to updating the characters in the compose field to include the complete username of the first user, receiving one or more additional characters beyond the username of the first user;

analyzing the received one or more additional characters beyond the username of the first user to determine if the one or more additional characters beyond the username of the first user comprise one or more selection characters for the set of selectable icons; and responsive to determining that the one or more additional characters beyond the username of the first user comprise one or more selection characters for the set of selectable icons:

updating the set of selectable icons according to the received one or more additional characters, comprising at least one of:

adjusting the highlighting in the look-up box according to the received one or more additional characters;

adjusting the set of selectable icons according to the received one or more additional characters; and responsive to updating the set of selectable icons, providing an autocomplete suggestion of remaining characters of the highlighted selectable icon in the compose field beyond the received one or more additional characters, wherein selection characters for the set of selectable icons comprise one or more of an up arrow, down arrow, or right arrow symbol, or a tab, letter, return, enter, or number character.

16. The method of claim 15, wherein the set of selectable icons comprises a first number of a greater plurality of icons, wherein each of the greater plurality of icons comprises a score, wherein the one or more rules in the personal reaction mode comprises a sorted list rule defining priority and determination of the set of selectable icons according to the received one or more additional characters, and wherein adjusting the set of selectable icons according to the received one or more additional characters comprises according to the sorted list rule, first reducing the greater plurality of icons according to the received one or more additional characters matching a first one or more characters of a description of the respective greater plurality of icons, and then based upon respective scores for each of the respective greater plurality of icons.

17. The method of claim 11, wherein the set of selectable icons comprises a first number of a greater plurality of icons, wherein each of the greater plurality of icons comprises a score, wherein the one or more rules in the personal reaction mode define adjustment or determination of scores of at least one of the greater plurality of icons, wherein providing the set of selectable icons to the first user comprises:

determining a priority for each of the greater plurality of icons of the first user based upon respective scores of the each of the icons; and determining the set of selectable icons to the first user based on the determined priorities, and wherein the one or more rules in the personal reaction mode comprises at least one of:

a default rule of basic icons defining a first default score for a first subset of basic icons higher than default scores for the remaining greater plurality of icons;

a user profile rule defining a second default score for a second subset of icons selected by the first user higher than the first default score, wherein individual icons of the second subset are the same or different than individual icons of the first subset;

a first user reaction history rule defining a selection history of selected icons of the first user, wherein the score of respective icons of the plurality of icons increases with each selection of the respective icons; or a semantic analysis rule defining a semantic score for specific icons associated with words or icons of the first user or other users in the communication stream, wherein the one or more characters comprises at least one of a symbol, a letter, or a number, wherein the action command comprises a first symbol, wherein the first symbol comprises at least one of an "@", an open bracket, an open parentheses, or a colon symbol, wherein succeeding the action command comprises immediately succeeding the action command, wherein the set of icons comprises a set of images, emojis, or text emotions, and wherein the representation of the first user comprises one of a profile picture or an avatar of the first user.

18. The method of claim 11, comprising:

responsive to providing the set of selectable icons to the first user, receiving one or more additional characters from the compose field;

analyzing the received one or more additional characters to determine if the received one or more additional characters comprise a transition character comprising one of a backspace, left arrow, space, escape, or delete symbol; and responsive to determining that the one or more additional characters comprises the transition character, transitioning from the personal reaction mode to a second response mode, comprising:

analyzing the identified one or more characters from the compose field to determine if the identified one or more characters match a first one or more characters of a username of one or more users different from the first user; and responsive to determining that the identified one or more characters match the first one or more characters of the username of one or more users, identifying the one or more users having usernames having the first one or more characters matching the identified one or more characters:
providing a set of the identified one or more users to the first user;
responsive to providing the set of the identified one or more users to the first user, receiving a selected one of the set of the identified one or more users as a selected user; and
causing a notification to be displayed to the selected user.

19. A system for providing a command-based personalized composite icon in a communication stream, comprising:
one or more processors; and
a memory storing computer-executable instructions that, when executed, cause the one or more processors to control the system to perform operations comprising:
detecting an action command in a compose field of a communication platform of a first user, wherein the action command indicates a function to be performed by a system,
parsing entries from the compose field subsequent to the action command to identify one or more characters succeeding the action command;
analyzing the identified one or more characters from the compose field to determine if the identified one or more characters match a first one or more characters of a username of the first user in the communication stream; and
entering a personal reaction mode, responsive to determining that the identified one or more characters match the first one or more characters of the username of the first user, allowing for selection of a personalized composite icon to be displayed in the communication stream, comprising:
providing, based upon one or more rules in the personal reaction mode, a set of selectable icons to the first user, the selectable icons indicating a desired reaction of the first user, the one or more rules defining priority or determination of the set of selectable icons;
receiving a selected one of the set of selectable icons as a selected icon from the first user; and
causing a personalized composite icon comprising a representation of the first user combined with the selected icon to be displayed in the communication stream.

20. The system of claim 19, wherein the set of selectable icons comprises a first number of a greater plurality of icons, wherein each of the greater plurality of icons comprises a score,
wherein providing the set of selectable icons to the first user comprises:
providing an autocomplete suggestion of remaining characters of the username of the first user beyond the identified one or more characters in the compose field;
receiving, responsive to providing the autocomplete suggestion, one or more additional characters from the compose field;
analyzing the received one or more additional characters to determine if the one or more additional characters comprise one of an accept character for the autocomplete suggestion or the remaining characters of the username of the first user;
updating, responsive to determining that the one or more additional characters comprise an accept character for the autocomplete suggestion or the remaining characters of the username of the first user, the characters in the compose field to include the complete username of the first user; and
highlighting, responsive to updating the characters in the compose field to include the complete username of the first user, a default representation of the user in a look-up box proximate the compose field,
wherein the accept character for the autocomplete suggestion comprises a right arrow or a tab symbol,
wherein the system comprises:
composing the personalized composite icon as a combination of the representation of the first user and the selected icon;
receiving, responsive to updating the characters in the compose field to include the complete username of the first user, one or more additional characters beyond the username of the first user;
analyzing the received one or more additional characters beyond the username of the first user to determine if the one or more additional characters beyond the username of the first user comprise one or more selection characters for the set of selectable icons; and
updating, responsive to determining that the one or more additional characters beyond the username of the first user comprise one or more selection characters for the set of selectable icons, the set of selectable icons according to the received one or more additional characters, comprising at least one of:
adjusting the highlighting in the look-up box according to the received one or more additional characters;
adjusting the set of selectable icons according to the received one or more additional characters; and
providing, responsive to updating the set of selectable icons, an autocomplete suggestion of remaining characters of the highlighted selectable icon in the compose field beyond the received one or more additional characters,
wherein selection characters for the set of selectable icons comprise one or more of an up arrow, down arrow, or right arrow symbol, or a tab, letter, return, enter, or number character,
wherein the one or more characters comprises at least one of a symbol, a letter, or a number,
wherein the action command comprises a first symbol, wherein the first symbol comprises at least one of an "@", an open bracket, an open parentheses, or a colon symbol,
wherein succeeding the action command comprises immediately succeeding the action command,
wherein the set of icons comprises a set of images, emojis, or text emotions, and
wherein the representation of the first user comprises one of a profile picture or an avatar of the first user.

* * * * *